US 11,375,363 B2

(12) United States Patent
Magadevan et al.

(10) Patent No.: US 11,375,363 B2
(45) Date of Patent: Jun. 28, 2022

(54) SECURE UPDATING OF TELECOMMUNICATION TERMINAL CONFIGURATION

(71) Applicant: T-Mobile USA, Inc., Bellevue, WA (US)

(72) Inventors: Poornima Magadevan, Bellevue, WA (US); Jeffrey Song, Bellevue, WA (US); Mathew George, Kirkland, WA (US); Senthil Kumar Mulluppadi Velusamy, Bellevue, WA (US); Cristian Asandului, Snoqualmie, WA (US); Thomas P. Lucht, Seattle, WA (US); Shelby Seward, Bellevue, WA (US); Phani Ramisetty, Sammamish, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 334 days.

(21) Appl. No.: 16/584,113

(22) Filed: Sep. 26, 2019

(65) Prior Publication Data

US 2020/0021585 A1 Jan. 16, 2020

Related U.S. Application Data

(62) Division of application No. 15/669,350, filed on Aug. 4, 2017, now Pat. No. 10,476,875.

(Continued)

(51) Int. Cl.
  *G06F 21/00* (2013.01)
  *H04W 8/24* (2009.01)
  (Continued)

(52) U.S. Cl.
  CPC ......... *H04W 8/245* (2013.01); *H04L 63/0869* (2013.01); *H04L 63/0876* (2013.01);
  (Continued)

(58) Field of Classification Search
  CPC ..... H04W 8/245; H04W 12/37; H04W 12/08; H04L 63/0869; H04L 63/0876;
  (Continued)

(56) References Cited

U.S. PATENT DOCUMENTS 6,226,749 B1    5/2001   Carloganu et al.
6,317,836 B1   11/2001   Goren et al.
(Continued)

FOREIGN PATENT DOCUMENTS

CN      1331371     8/2007
CN    101398872     4/2009
(Continued)

OTHER PUBLICATIONS

Crawford et al. A framework for continuous, transparent mobile device authentication, Computers & Security, vol. 39, Part B, 2013. pp. 127-136. ISSN 0167-4048, https://doi.org/10.1016/j.cose.2013.05.005 (https://www.sciencedirect.com/science/article/pii/S0167404813000886) (Year: 2013).*

(Continued)

*Primary Examiner* — Kendall Dolly
(74) *Attorney, Agent, or Firm* — Lee & Hayes, P.C.

(57) ABSTRACT

A network terminal, e.g., a smartphone, can retrieve, from a datastore, a cryptographically-signed configuration record including a device identifier of the terminal. The terminal can transmit a request message comprising the configuration record and the device identifier. A network device can verify authenticity of the device identifier and a match between the identifier in the record and the identifier in the message. In response to confirmation of the request by a policy engine, (Continued)

the network device can determine a reply message comprising a cryptographically-signed second configuration record that includes a second device identifier. The terminal can verify that the signature is valid and that the second device identifier matches the device identifier. In response, the terminal can modify data in the datastore according to the second configuration record. The configuration record can lock or unlock the terminal, or determine permitted services or network peers.

20 Claims, 11 Drawing Sheets

Related U.S. Application Data

(60) Provisional application No. 62/488,435, filed on Apr. 21, 2017.

(51) Int. Cl.
    *H04W 12/37* (2021.01)
    *H04L 9/40* (2022.01)
    *H04W 12/08* (2021.01)

(52) U.S. Cl.
    CPC .......... *H04L 63/102* (2013.01); *H04L 63/126* (2013.01); *H04W 12/37* (2021.01); *H04L 63/0428* (2013.01); *H04L 63/0823* (2013.01); *H04W 12/08* (2013.01)

(58) Field of Classification Search
    CPC . H04L 63/102; H04L 63/126; H04L 63/0428; H04L 63/0823
    See application file for complete search history.

(56) References Cited

U.S. PATENT DOCUMENTS

| | | | |
|---|---|---|---|
| 6,321,079 B1 | 11/2001 | Cooper | |
| 6,327,660 B1 | 12/2001 | Patel | |
| 7,689,204 B2 | 3/2010 | Dupuis et al. | |
| 8,369,823 B2 | 2/2013 | Chen | |
| 8,737,318 B2 | 5/2014 | Fan et al. | |
| 9,055,443 B2 | 6/2015 | Froelich et al. | |
| 9,172,538 B2 | 10/2015 | Obaidi | |
| 9,319,884 B2 | 4/2016 | Buzescu et al. | |
| 9,456,349 B2 | 9/2016 | Kim et al. | |
| 9,591,484 B2 | 3/2017 | Ionescu et al. | |
| 9,940,146 B2* | 4/2018 | Bieswanger | G06F 9/44505 |
| 10,123,202 B1 | 11/2018 | Polehn et al. | |
| 10,299,128 B1 | 5/2019 | Suthar et al. | |
| 2004/0203605 A1 | 10/2004 | Safa | |
| 2005/0172135 A1 | 8/2005 | Wiersma | |
| 2006/0075259 A1 | 4/2006 | Bajikar et al. | |
| 2007/0072620 A1 | 3/2007 | Levitan | |
| 2007/0154014 A1 | 7/2007 | Aissi et al. | |
| 2007/0180269 A1 | 8/2007 | Irish et al. | |
| 2007/0264990 A1 | 11/2007 | Droste et al. | |
| 2008/0090614 A1* | 4/2008 | Sicher | H04W 8/205 455/558 |
| 2008/0125084 A1 | 5/2008 | Cambois et al. | |
| 2008/0132226 A1 | 6/2008 | Carnall | |
| 2008/0209206 A1 | 8/2008 | Vaha-Sipila et al. | |
| 2008/0229092 A1 | 9/2008 | Dale et al. | |
| 2008/0282084 A1 | 11/2008 | Hatakeyama | |
| 2008/0307494 A1 | 12/2008 | Holtzman et al. | |
| 2009/0083858 A1 | 3/2009 | Jennings et al. | |
| 2009/0158419 A1 | 6/2009 | Boyce | |
| 2009/0165119 A1 | 6/2009 | Ramanath | |
| 2009/0270126 A1 | 10/2009 | Liu | |
| 2009/0325646 A1 | 12/2009 | Stewart et al. | |
| 2010/0082968 A1 | 4/2010 | Beverly | |
| 2010/0263043 A1 | 10/2010 | Xu | |
| 2010/0273452 A1 | 10/2010 | Rajann et al. | |
| 2010/0299744 A1 | 11/2010 | Mardiks | |
| 2011/0076986 A1 | 3/2011 | Glendinning et al. | |
| 2011/0081889 A1 | 4/2011 | Gao et al. | |
| 2011/0130117 A1 | 6/2011 | Fan et al. | |
| 2011/0130118 A1 | 6/2011 | Fan et al. | |
| 2011/0159843 A1 | 6/2011 | Heath et al. | |
| 2011/0212706 A1 | 9/2011 | Uusilehto | |
| 2011/0307711 A1 | 12/2011 | Novak et al. | |
| 2012/0042376 A1 | 2/2012 | Dolgunov et al. | |
| 2012/0042396 A1 | 2/2012 | Guerra et al. | |
| 2012/0058743 A1 | 3/2012 | Chen | |
| 2012/0083242 A1 | 4/2012 | Spitz et al. | |
| 2012/0101941 A1 | 4/2012 | Kang et al. | |
| 2012/0157055 A1 | 6/2012 | Ren et al. | |
| 2013/0078951 A1 | 3/2013 | Mun et al. | |
| 2013/0210389 A1 | 8/2013 | Obaidi | |
| 2013/0304616 A1 | 11/2013 | Raleigh et al. | |
| 2013/0305047 A1 | 11/2013 | Xi et al. | |
| 2013/0326643 A1 | 12/2013 | Pai et al. | |
| 2014/0057597 A1 | 2/2014 | Velusamy et al. | |
| 2015/0007275 A1* | 1/2015 | Hilbert | G06F 21/70 726/4 |
| 2016/0019735 A1 | 1/2016 | Myers et al. | |
| 2016/0029220 A1 | 1/2016 | Obaidi | |
| 2016/0037344 A1 | 2/2016 | Kim et al. | |
| 2016/0100309 A1 | 4/2016 | Velusamy | |
| 2018/0167198 A1 | 6/2018 | Muller et al. | |
| 2018/0309754 A1 | 10/2018 | Magadevan et al. | |
| 2018/0309868 A1 | 10/2018 | Karimli et al. | |
| 2019/0007840 A1 | 1/2019 | Velusamy et al. | |
| 2020/0245128 A1 | 7/2020 | Obaidi | |

FOREIGN PATENT DOCUMENTS

| | | | |
|---|---|---|---|
| EP | 1359733 | | 11/2003 |
| EP | 1659810 | A1 | 5/2006 |
| EP | 2063378 | | 5/2009 |
| WO | WO2004063871 | | 7/2004 |
| WO | WO2007014287 | A1 | 2/2007 |
| WO | WO2008077628 | A2 | 7/2008 |
| WO | WO2013158977 | | 10/2013 |

OTHER PUBLICATIONS

Chinese Office Action dated Jul. 28, 2021 for Chinese Patent Application No. 201880026128.1, a foreign counterpart to U.S. Pat. No. 10,476,875, 13 pages.

Extended European Search Report dated Dec. 9, 2020 for European Patent Application No. 18787933.3, 10 pages.

Lee, et al., "A New Delegation-Based Authentication Protocol for Use in Portable Communication Systems", IEEE Transactions on Wireless Communications, vol. 4, No. 1, Jan. 2005, 9 pgs.

Barriga, L., et al., "M2M Remote-Subscription Management", Ericsson Review, 2011, 6 pages.

Cartes 2012 Demo Presentation, Giesecke and Devrient, retrieved Jun. 16, 2016 from «https://www.gi-de.com/gd_media/media/documents/complementary_material/events_1/04_STE_CARTES_Demo_Presentation.pdf», 9 pages.

Chinese Office Action dated Feb. 26, 2016 for Chinese patent application No. 201280053062.8, a counterpart foreign application of U.S. Pat. No. 9,055,443.

Chinese Office Action dated Jun. 2, 2017 for Chinese patent application No. 201380020694.9, a counterpart foreign application of U.S. Pat. No. 9,319,884.

Chinese Office Action dated Sep. 28, 2016 for Chinese Patent Application No. 201280053062.8, a counterpart foreign application of U.S. Pat. No. 9,055,443.

"Device Management Architecture", Open Mobile Alliance, 2016, pp. 13-23, 30-32, 45-53, 93-99.

European Office Action dated Nov. 29, 2018 for European Patent Application No. 12843678.9, a counterpart to U.S. Pat. No. 9,055,443, 5 pages.

European Office Action dated Nov. 30, 2017 for European patent application No. 13778691.9, a counterpart foreign application of U.S. Pat. No. 9,319,884, 5 pages.

(56) References Cited

OTHER PUBLICATIONS

European Office Action dated Mar. 9, 2018 for European Patent Application No. 12843678.9, a counterpart foreign application of U.S. Pat. No. 9,055,443, 8 pages.
European Office Action dated May 8, 2018 for European patent application No. 13778922.8, a counterpart foreign application of U.S. Pat. No. 9,591,484, 4 pages.
European Office Action dated Jul. 10, 2019 for European Patent Application No. 12843678.9, a counterpart of U.S. Pat. No. 9,055,443, 11 pages.
Extended European Search Report dated Nov. 11, 2015 for European patent application No. 1377892238, 6 pages.
Extended European Search Report dated Nov. 27, 2015 for European patent application No. 13778691.9, 9 pages.
Extended European Search Report dated May 20, 2015 for European Patent Application No. 12843678.9, 8 pages.
PCT Search Report and Written Opinion dated Jul. 27, 2018, for PCT Application No. PCT/US18/27490, 11 pages.
Final Office Action for U.S. Appl. No. 13/660,350, dated Jan. 13, 2014, Ahmad Arash Obaidi, "Mobile Device-Type Locking", 8 pages.
Kanonov, U., "Secure Containers in Android: the Samsung KNOX Case Study", arXiv:1605.08567, May 27, 2016, pp. 1-19.
Lee, et al., "A New Delegation-Based Authentication Protocol for Use in Portable Communication Systems", IEEE Transactions on Wireless Communications, vol. 4, No. 1, Jan. 2005, pp. 57-64, 9 pages.
Office Action for U.S. Appl. No. 15/494,305, dated Jan. 10, 2018, Yasmin Karimli, "Network-based Device Locking Management", 16 pages.
Office action for U.S. Appl. No. 13/796,550, dated Jan. 11, 2016, Velusamy et al., "SIM Level Mobile Security", 20 pages.
Office action for U.S. Appl. No. 13/796,550, dated Jan. 12, 2018, Velusamy et al., "SIM Level Mobile Security", 27 pages.
Office Action for U.S. Appl. No. 13/796,550, dated Jan. 26, 2015, Senthil Kumar Mulluppadi Velusamy, "SIM Level Mobile Security", 18 pages.
Office Action for U.S. Appl. No. 13/842,116, dated Jan. 27, 2015, Ahmad Arash Obaidi, "Secure Lock for Mobile Device", 7 pages.
Office Action for U.S. Appl. No. 16/126,865, dated Oct. 12, 2018, Velusamy et al, "SIM Level Mobile Security", 9 pages.
Office action for U.S. Appl. No. 13/796,550, dated Nov. 10, 2016, Velusamy et al., "SIM Level Mobile Security", 23 pages.
Final Office Action for U.S. Appl. No. 13/840,045, dated Nov. 17, 2014, Adrian Buzescu, "Remote Unlocking of Telecommunication Device Functionality", 12 pages.
Office Action for U.S. Appl. No. 14/874,023, Obaidi, dated Dec. 21, 2015, 7 pages.
Office action for U.S. Appl. No. 13/839,189, dated Dec. 23, 2015, Ionescu et al., "Secure Environment for Subscriber Device", 14 pages.
Office Action for U.S. Appl. No. 13/839,189, dated Feb. 24, 2015, Alexandru Catalin Ionescu, "Secure Environment for Subscriber Device", 8 pages.
Office action for U.S. Appl. No. 13/796,550, dated Mar. 29, 2017, Velusamy et al., "SIM Level Mobile Security", 24 pages.
Final Office Action for U.S. Appl. No. 15/669,350, dated Mar. 8, 2019, Magadevan, "Secure Updating of Telecommunication Terminal Configuration ", 17 pages.
Final Office Action for U.S. Appl. No. 13/796,550, dated May 13, 2015, Senthil Kumar Mulluppadi Velusamy, "SIM Level Mobile Security", 18 pages.
Final Office Action for U.S. Appl. No. 13/796,550, dated May 23, 2016, Senthil Kumar Mulluppadi Velusamy, "SIM Level Mobile Security", 22 pages.
Office Action for U.S. Appl. No. 16/262,559, dated Jun. 26, 2019, Obaidi, "Remote SIM Unlock (RSU) Implementation Using Blockchain", 21 pages.
Office action for U.S. Appl. No. 13/839,189, dated Jul. 11, 2016, Ionescu et al., "Secure Environment for Subscriber Device", 15 pages.
Office action for U.S. Appl. No. 13/660,350, dated Jul. 22, 2013, Obaidi, "Mobile Device-Type Locking", 8 pages.
Office action for U.S. Appl. No. 13/840,045, dated Jul. 29, 2015, Buzescu et al., "Remote Unlocking of Telecommunication Device Functionality", 10 pages.
Office action for U.S. Appl. No. 13/840,045, dated Jul. 30, 2014, Buzescu et al., "Remote Unlocking of Telecommunication Device Functionality", 11 pages.
Office action for U.S. Appl. No. 13/839,189, dated Aug. 21, 2015, Ionescu et al., "Secure Environment for Subscriber Device", 7 pages.
Office Action for U.S. Appl. No. 13/796,550, dated Aug. 25, 2017, Velusamy, "SIM Level Mobile Security", 25 pages.
Office action for U.S. Appl. No. 13/660,350, dated Aug. 7, 2014, Froelich et al., "Mobile Device-Type Locking", 8 pages.
"OMA Device Management Protocol", Open Mobile Alliance, 2016, pp. 7-16.
PCT Search Report and Written Opinion dated Jan. 17, 2013 for PCT Application No. PCT/US12/62050, 10 pages.
PCT Search Report dated Jul. 1, 2013 for PCT application No. PCT/US13/37345, 10 pages.
PCT Search Report dated Jul. 30, 2013 for PCT application No. PCT/US13/37332, 13 pages.
PCT Search Report and Written Opinion dated Sep. 17, 2013 for PCT application No. PCT/US13/37381, 11 pages.
"Sim lock", Wikipedia, retrieved Jun. 30, 2017, from «https://en.wikipedia.org/w/index.php?title=SIM_lock&oldid=715512588», pp. 1-12.
"Subscriber Identity Module", Wikipedia, retrieved Jun. 17, 2017, from «https://en.wikipedia.org/w/index.php?title=Subscriber_identity_module&oldid=712259654», pp. 1-12.
European Office Action dated Apr. 29, 2020 for European Patent Application No. 12843678.9, a counterpart foreign application of the U.S. Pat. No. 9,055,443, 9 pages.
Dficie Action for U.S. Appl. No. 16/262,559, dated May 28, 2020, Obaidi, "Remote SIM Unlock (RSU) Implementation Using Blockchain", 34 Pages.
Office Action for U.S. Appl. No. 16/262,559, dated Dec. 26, 2019, Obaidi, "Remote SIM Unlock (RSU) Implementation Using Blockchain", 33 Pages.

\* cited by examiner

SECURE UPDATING OF TELECOMMUNICATION TERMINAL CONFIGURATION

CROSS-REFERENCE TO RELATED APPLICATIONS

This application is a divisional of and claims priority to U.S. application Ser. No. 15/669,350, filed on Aug. 4, 2017 and entitled "Secure Updating of Telecommunication Terminal Configuration," which is a non-provisional of and claims priority to U.S. Patent Application Ser. No. 62/488,435, filed Apr. 21, 2017, and entitled "Trusted-Execution-Environment-Agnostic Remote SIM Unlock," the entirety of which are incorporated herein by reference.

BACKGROUND

A computing device configured for telecommunication, such as a wireless phone, is generally capable of communicating to various networks, e.g., cellular or data networks. However, not all telecommunication devices connectable to a particular network are necessarily capable of providing full device functionality while connected to that network. Moreover, devices that are upgradeable in the field may have software vulnerabilities that can be exploited by malicious actors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. The figures are not necessarily to scale.

For brevity of illustration, in the diagrams herein, an arrow beginning with a diamond connects a first component or operation (at the diamond end) to at least one second component or operation that is or can be included in the first component or operation in at least one example.

DETAILED DESCRIPTION

Overview

Figure 1:
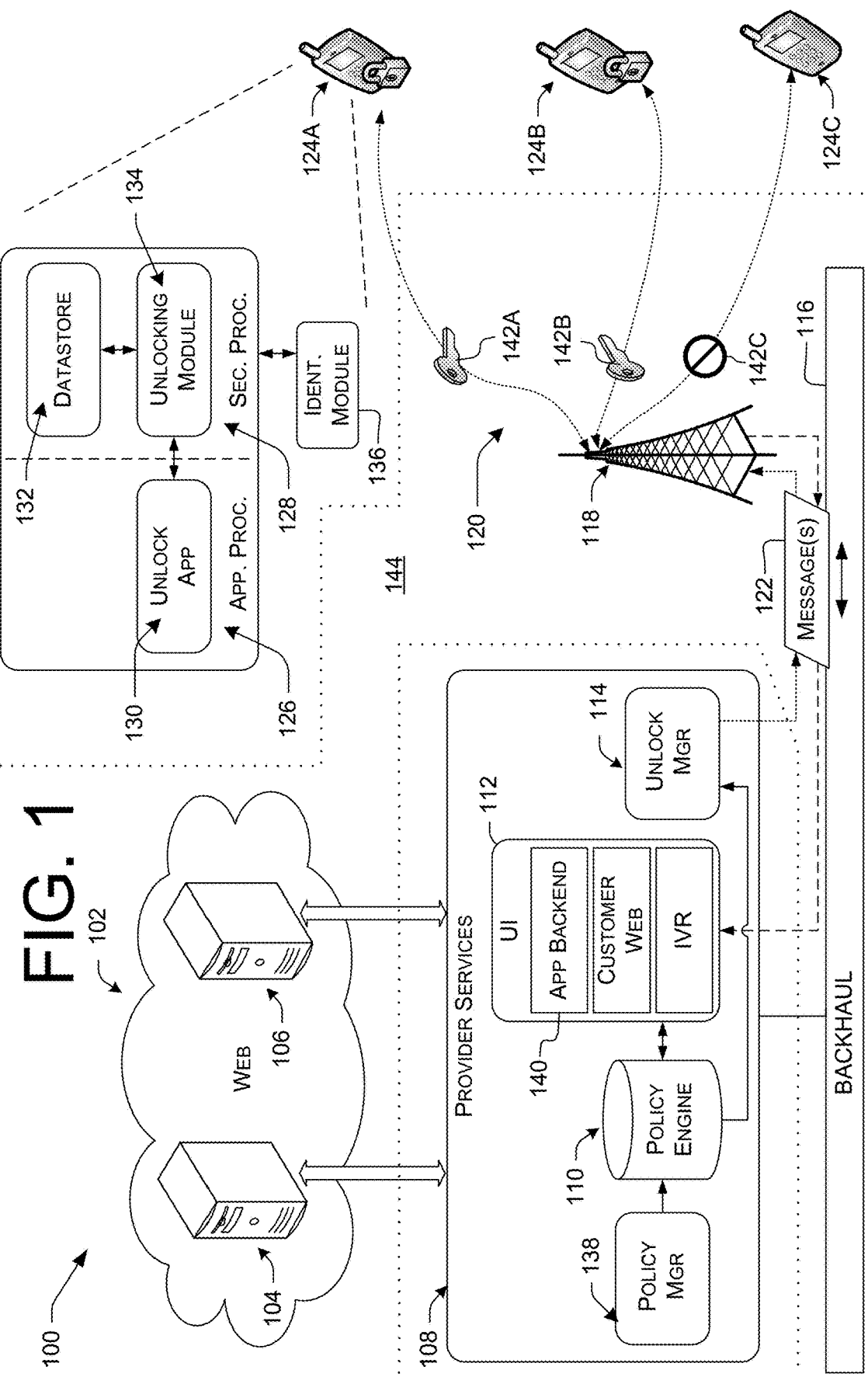
FIG. 1 illustrates an example telecommunications environment in which remote configuration updates can be performed, e.g., to permit a provider services entity to remotely unlock telecommunication devices based on policies and in response to user requests.

Many mobile telecommunications devices retrieve and use identification or authorization information on a Subscriber Identity Module (SIM) card. SIM cards enable a telecommunication service subscriber to be identified on a corresponding service provider's network by storing a unique International Mobile Subscriber Identity (IMSI). A telecommunications device can retrieve the IMSI and authenticate itself over the air to the service provider using the IMSI, e.g., each time a user device engages in communications with the service provider. A SIM IMSI generally includes the following information: a Mobile Country Code (MCC), a Mobile Network Code (MNC), and a Mobile Subscriber Identification Number (MSIN). This information allows a user's provider-issued SIM card to be identified, registered, and authenticated with an issuing telecommunication service provider.

Many carriers (e.g., telecommunications network operators or virtual network operators) certify particular telecommunication devices for use on their particular networks. Some devices are provisioned by the carrier or a cooperating equipment manufacturer with configuration records that control access to various device features, depending on the SIM card present in the device. This can provide the carrier with an increased degree of control over the devices on its network, which can reduce the chance of network disruption.

However, it is sometimes necessary to adjust or remove those access controls. For example, removal of access controls can permit a user to travel to a different country and still use the same device by changing the SIM card used in that device. Similarly, a device may be locked over the air if it is reported stolen. After the device is recovered by its owner, it must be unlocked so that the owner can again make use of it. Some prior schemes for modifying configuration records involve physical communication with the device, e.g., at a repair shop, or require a complex architecture involving multiple operating systems running in parallel on a particular device. There is, therefore, a need for a way of adjusting device configuration parameters, such as access controls, with reduced burden on the user's time and with reduced system complexity.

In some examples described herein, a configuration record in a datastore of a communications device can be updated remotely upon verification of cryptographic signatures and device identifiers. This can permit locking or unlocking a device, or otherwise altering device configuration, over the air, without requiring a visit to a repair facility. This can permit users to request unlocking at any time, e.g., via an app running on the device itself. Example techniques herein can operate without requiring a separate, secure operating system in addition to the device's main operating system. This can reduce the storage requirements of software on the device, and can reduce the power consumption of the device, thereby increasing its battery life.

As used herein, a "terminal" is a communication device, e.g., a cellular telephone or other user equipment (UE), configured to perform, or intercommunicate with systems configured to perform, techniques described herein. Terminals can include, e.g., wireless voice- or data-communication devices. A terminal can include a user interface (e.g., as does a smartphone), but is not required to. For example, a streaming server configured to provide audio or visual content on demand can be a terminal. Such a terminal may not include a user interface, instead relying on interfaces at other terminals to form queries and send those queries to the server.

The term "packet" is used herein to refer generally to data packets, frames, datagrams, or any other identifiable units of data that include a header and a payload and that are transmitted or received via a communication network. Throughout this document, discussions of transmissions, e.g., of packets, from specified origins or to specified destinations can include any number, zero or more, of intervening network devices, unless otherwise expressly specified.

Illustrative Configurations

FIG. 1 depicts an example telecommunication system/network 100. In some examples, the system 100 is communicatively connected with the world-wide web (WWW) 102 or another regional-, national-, or international-scale network. System 100 can include multiple affiliated network servers, shown as servers 104 and 106, e.g., reachable via WWW 102 or other links. The system 100 includes, but is not limited to, a provider services entity 108, e.g., server(s) of a mobile network operator, in communication with the affiliated network servers 104 and 106. It should be appreciated that telecommunication system 100 of FIG. 1 is intended to depict a simplified representation of a telecommunication network that can employ any mixture of 2G, 3G, 4G, non-3GPP (e.g., VoWIFI or WiMAX), or other access technologies. These and other example access technologies are commonly utilized in a real-world, heterogeneous telecommunication network deployments.

The provider services entity 108 can be operated by or affiliated with a cellular carrier or other network operator. The provider services entity 108 can include a policy engine 110, a user interface (UI) component 112, and an unlock manager 114, e.g., a mobile device management/trusted service manager (MDM/TSM) component. The policy engine 110 can be configured to determine whether a particular configuration-change request is authorized or otherwise appropriate to carry out. The UI component 112 can include components, discussed below, permitting users to submit configuration-change requests as they see fit, without needing to visit a repair facility or call a call center during particular hours. The unlock manager 114 can communicate with terminals to support configuration changes. In some examples, the UI component 112 and the unlock manager 114 can be combined into one module or component that performs the function of both. Throughout this document, techniques used for unlocking devices can additionally or alternatively be used for other types of configuration changes, unless otherwise expressly specified.

The provider services entity 108 is also in communication, e.g., via portions of a network backhaul 116 and/or via other distributed portions of the network (not shown), with one or more network base stations 118, e.g., enhanced Node-B (eNodeB) stations. Further, system 100 includes an access network 120 or other over-the-air (OTA) interface, e.g., provided by base stations 118, that facilitates radio communication of messages 122 between the provider services entity 108 and one or more user telecommunication devices or other terminals 124A-124C (individually or collectively referred to by reference 124), via a network base station 118. Messages 122 can be carried, e.g., via Internet Protocol (IP) data communication, Signaling System 7 (SS7) communications such as SMS communication, or other protocols. Messages 122 can be carried in wired or wireless form across backhaul 116, and in wireless form from base station 118 to terminals 124.

The terminals 124 may be representative of any number common wireless communication devices, including cellular phones, tablet computers, electronic book devices, handheld gaming units, personal media players, etc., which can be connected to the telecommunication system 100 utilizing one or more wireless base stations 118, or any other common wireless or wireline network access technology. Further, the terminals 124 may be configured to run various operating systems, including but not limited to, Microsoft Windows Mobile®, Google Android®, Apple iOS®, Linux® Mobile, or any other common mobile device operating systems.

In various embodiments, each of the terminals 124 may have an application processor 126 that conducts or facilitates communication with a security processor 128. The application processor 126 may execute an unlock application 130, which may receive notifications, configuration records, instructions, triggers, or other communications via messages 122 from the provider services entity 108. The unlock application 130 can be included in an operating system (OS) of the device or can be separate from the OS, e.g., downloaded through an application store. For brevity, discussion herein of unlock application 130 includes both in-OS and separate-from-OS implementations of the unlock application 130, unless otherwise specified.

The security processor 128 can include or be communicatively connected with a datastore 132, e.g., a secure filesystem accessible to the security processor 128 but not to the application processor 126 or apps running on the terminals 124. The unlock application 130 may provide part or all of message(s) 122 to an unlocking module 134 running on the security processor 128. The unlocking module 134 can communicate with the unlock manager 114 of the provider services entity 108 to authorize and carry out changes to a configuration of the terminal 124, e.g., unlocking of the terminal 124. The security processor 128 can also communicate with an identification module 136, such as a SIM card, of the terminal 124. The unlock application 130 may cause display or another presentation of status information or notifications pertaining to the configuration change.

The telecommunication system 100 can include or employ any combination of common wireless broadband communication technologies, including, but not limited to, Long Term Evolution (LTE), LTE Advanced, High-Speed Data Packet Access (HSDPA), Evolved High-Speed Packet Access (HSPA+), Universal Mobile Telecommunication System (UMTS), Code-Division Multiple Access (CDMA), Global System for Mobile Communications (GSM), WIMAX, and WIFI. Further, the backhaul 116 of the telecommunication system 100 may be configured to employ any common wireline communication technology, including but not limited to, optical fiber, coaxial cable, twisted pair cable, Ethernet cable, and power-line cable, along with any common wireless communication technology, such as those described above.

In some embodiments, the provider services entity 108 includes a policy manager component ("policy manager") 138, e.g., a policy and subscription manager component. The policy manager 138 may enable adding, deleting, and editing of one or more policies. Also, the policy manager 138 may communicate with policy manager tools of a business user responsible for setting or entering policies on behalf of the telecommunication services provider. The policies may reflect business priorities, plans, and decisions of the telecommunication services provider. The business user may also enter policy overrides on a case-by-case basis. Those updates are provided through the policy manager tools to the policy manager 138 and from the policy manager 138 to the policy engine 110. In various embodiments, one or more policies may be received by the policy engine 110 from the policy manager 138.

In a scenario in which a particular terminal 124 has been locked, a user can remedy this problem at the user's convenience by interacting with the user's provider services entity 108 via UI tools its UI component 112.

An example UI tool of the UI component 112 may be a customer web interface that allows a user of a locked terminal 124 to use a dedicated customer account webpage (not shown) to perform various user-driven account management functions. In one implementation, a user-driven account management function of a customer's account webpage can facilitate a user unlocking their terminal 124 over the Web 102 or another network.

An additional or alternative UI tool of the UI component 112 may be an Interactive Voice Response (IVR) system, which allows a user to call a phone number associated with the IVR system and then follow pre-recorded voice instructions/prompts to attempt to unlock the user's communication device, in a similar manner to the other UI tool routines described above.

Still another additional or alternative UI tool of the UI component 112 may be an application backend 140 ("app backend") configured for communication with a unlock application 130 or another software tool running on the device to be unlocked. The device can permit access to unlock application 130 even if other functions of the device are locked. Through the device, the user can request unlocking or another configuration change. In some examples, policy engine 110 and the app backend 140 of UI component 112 may be combined into a single component, or may be separate components.

Regardless of which UI tool of the UI component 112 is used, the user may provide a request for a permanent or temporary unlock of the terminal 124. If a temporary unlock, the user may select or specify a time period for the unlock. Alternatively, the policy manager 138 may specify the time period or duration of the unlock. A temporary unlock may be sought, for instance, when the user will be traveling in another country and will need to use a SIM card of a different service provider to access telecommunication services in that country. By contrast, a permanent unlock may not have a time period, but may instead be effective indefinitely once applied.

When initiating the request, the user may be asked for a device identifier, such as an IMEI, which the provider services entity may validate against a register of device identifiers, such as an Equipment Identity Register (EIR), e.g., implemented by or as server 106. Alternatively, the unlock application 130 may provide the IMEI as part of a request message to the app backend 140. If the IMEI validates, the request can be provided to a policy engine 110 of the provider services entity 108.

The policy engine 110 of the provider services entity 108 can maintain user account information, as well as service provider policies within a resident or distributed service provider data store, to enable customer accounts and affiliated terminals 124 to be managed by a corresponding telecommunication service provider using the provider services entity 108. In various scenarios, a particular service provider may also elect to enforce particular service policies via its policy engine 110, in such a manner as to facilitate any of the above unlocking schemes with its UI component 112.

In various embodiments, the policy engine 110 decides, based at least on the one or more policies, whether to unlock the functionality of a terminal 124, or to make another requested configuration change. If the request seeks a permanent unlock, and if the policy engine 110 decides based on policies not to unlock the functionality, the policy engine 110 may take various actions. In some examples, the policy engine 110 may cause a message, such as a SMS message or communication from app backend 140 to unlock application 130, to be sent to the terminal 124 informing the user of the terminal 124 that the request has been denied. Additionally or alternatively, the policy engine 110 may decide whether to provide a temporary unlock of the functionality instead of the requested permanent unlock.

In some embodiments, if the request seeks a temporary unlock, or if the policy engine 110 decides not to provide a permanent unlock, the policy engine 110 decides, based at least in part on the one or more policies, whether to temporarily unlock the functionality. If the policy engine 110 decides against temporarily unlocking the functionality, the policy engine 110 may cause a message, such as a SMS message informing the user of the terminal 124 that the request has been denied.

If the policy engine 110 decides, based at least in part on the one or more policies, to permanently or temporarily unlock the terminal 124, the policy engine 110 may cause a message to be sent to the terminal 124 informing the user of the terminal 124 that the unlock has been granted. Such a notification may include the time period for the unlock if the unlock is a temporary unlock. The policy engine 110 also notifies an unlock manager 114 of the provider services entity 108 that the functionality of the terminal 124 is to be permanent or temporarily unlocked and, if temporarily unlocked, of the time period for the temporary unlock.

In some embodiments, the unlock manager 114 of the provider services entity 108 may communicate configuration records 142 in message(s) 122 to terminals 124. The configuration records can include, e.g., device unlocking triggers, also referred to as unlocking instructions, or service blocking triggers. In the illustrated example, configuration records 142A and 142B include unlocking triggers, and configuration record 142C includes a service blocking trigger. Further examples of interactions between the unlock manager 114 and the terminal 124 (or other telecommunication device) are described herein with reference to FIGS. 2-4 and 6-10.

In some examples, the unlock manager 114 can communicate the configuration records 142A-142B to the terminals 124A-124B responsive to receiving notifications from the policy engine 110 that the terminals 124A-124B are to be unlocked. The unlock manager 114 may communicate the configuration records 142A-142B using secure communication sessions with the terminals 124A-124B, e.g., a Secure Sockets Layer (SSL) connection.

For brevity herein, in some examples, a communications network 144 can include at least portions of the Internet (e.g., carrying Web 102 traffic), backhaul 116, or access network(s) 120.

Figure 2:
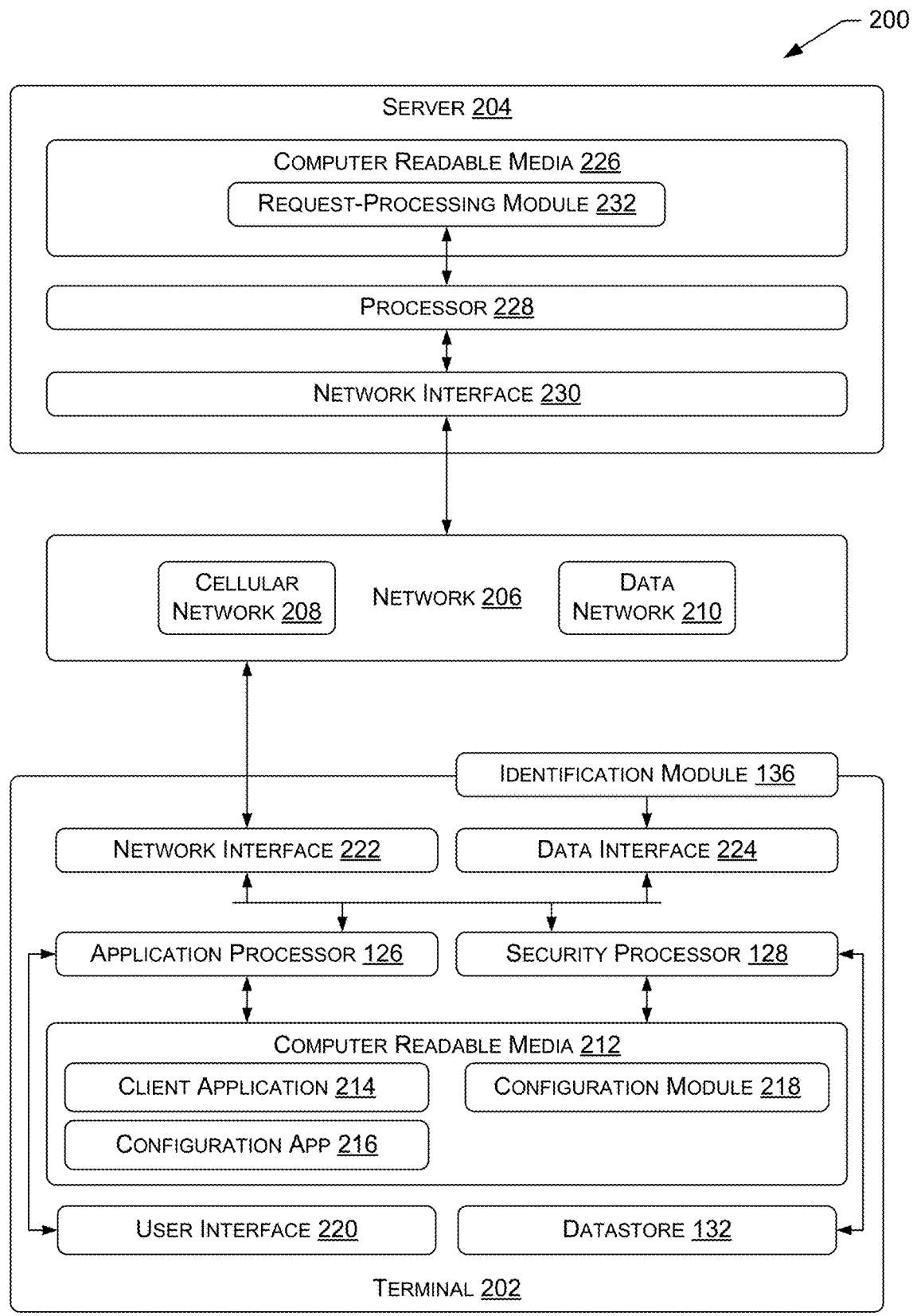
FIG. 2 is a block diagram illustrating an example system for implementing over-the-air or other remote configuration updating of telecommunication terminals.

FIG. 2 is a block diagram illustrating a telecommunication system 200 permitting over-the-air or other remote configuration updating according to some implementations.

The system 200 includes a terminal 202, e.g., a wireless phone or other user equipment such as terminals 124A-124C, FIG. 1, coupled to a server 204 via a communications network 206, which can represent communications network 144. The server 204 can be an example of the UI 112, unlock manager 114, or other components of or operated by provider services entity 108, FIG. 1. The network 206 can represent Web 102, over-the-air networks, or other networks. Network 206, can include one or more networks, such as a cellular network 208 (which can represent access network 120) and a data network 210 (which can represent backhaul 116). The network 206 can include one or more core network(s) connected to user equipment via one or more access network(s) 120.

The cellular network 208 can provide wide-area wireless coverage. Example cellular networks 208 can include second-generation (2G) cellular networks such as the GSM or Code Division Multiple Access (CDMA), or third-generation (3G) cellular networks such as the Universal Mobile Telecommunications System (UMTS). Other example cellular networks 208 can include Enhanced Data GSM Environment (EDGE), GSM EDGE Radio Access Network (GERAN), UMTS Terrestrial Radio Access Network (UTRAN), or fourth-generation (4G) cellular networks, such as LTE carrying VoLTE sessions using SIP signaling. Other example cellular networks 208 can include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Advanced Mobile Phone System (AMPS), High Speed Packet Access (HSPA), evolved HSPA (HSPA+), The data network 210 can include various types of networks for transmitting and receiving data (e.g., packets), including networks using technologies such as IEEE 802.1x protocols, wireless microwave access (WIMAX), WIFI, IEEE 802.15.1 ("BLUETOOTH"), Asynchronous Transfer Mode (ATM), and other network technologies, e.g., configured to transport IP packets, and/or any future IP-based network technology or evolution of an existing IP-based network technology. In some examples, the server 204 includes or is communicatively connected with an interworking function (IWF) or other device bridging networks, e.g., LTE, 3G, or POTS networks.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry packets using High Speed Packet Access (HSPA), LTE, or other technologies as well as voice traffic. Some cellular networks 208 carry both data and voice in a packet-switched format. For example, many LTE networks carry voice traffic in packets according to the voice-over-LTE (VoLTE) standard. Many data networks 210 can carry over-the-top (OTT) sessions encapsulating, e.g., voice or video data in a way transparent to an underlying packet transport. Communication between the server 204 and terminals such as the terminal 202 can additionally or alternatively be performed using other types of networks 206, such as Ethernet, optical links (e.g., Synchronous Optical NETwork, SONET), or other computer networks.

The terminal 202 can be or include a wireless phone or any other type of terminal, such as discussed herein with reference to FIG. 1. The terminal 202 can include an application processor 126 and a security processor 128. Those processors 126, 128 can be or include, e.g., one or more processor devices such as microprocessors, microcontrollers, central processing units (CPUs), graphics processing units (GPUs), general-purpose GPUs (GPGPUs), field-programmable gate arrays (FPGAs), application-specific integrated circuits (ASICs), Application-Specific Standard Products (ASSP), System-On-a-Chip systems (SoCs), programmable logic devices (PLDs), programmable logic arrays (PLAs), programmable array logic devices (PALs), or digital signal processors (DSPs). For example, application processor 126 can be a CPU used for general functions of terminal 202, e.g., running user-facing apps, and security processor 128 can be a special-purpose CPU or other control unit integrated with a baseband or modem of terminal 202.

Terminal 202 can include one or more computer-readable media (CRM) 212. The CRM 212 can be used to store data and to store instructions that are executable by the processors 126 or 128 to perform various functions as described herein. The CRM 212 can store various types of data or processor-executable instructions, such as an operating system, device drivers, etc. The processor-executable instructions can be executed by the processors 126 or 128 to perform various functions described herein.

Computer-readable media described herein, e.g., CRM 212, includes computer storage media and communication media. Computer storage media includes tangible, non-transitory storage units such as volatile memory, nonvolatile memory, or other persistent or auxiliary computer storage media, or removable and non-removable computer storage media implemented in any method or technology for storage of information such as computer-readable instructions, data structures, program modules, or other data. Computer storage media includes tangible, non-transitory, or other physical forms of media included in a device or hardware component that is part of a device or external to a device, including but not limited to random access memory (RAM), static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices (SSDs), storage arrays, network attached storage, storage area networks, hosted computer storage or memories, storage, devices, or storage media that can be used to store and maintain information for access by processors 126 or 128, or other components of terminal 202.

In contrast to computer storage media, communication media can embody computer-readable instructions, data structures, program modules, or other data in a modulated data signal, such as a carrier wave, or other transmission mechanism. As defined herein, computer storage media does not include communication media.

CRM 212 can include processor-executable instructions of a client application 214. The client application 214, e.g., a native or other dialer, can permit a user to originate and terminate communication sessions associated with the terminal 202, e.g., wireless phone. CRM 212 can additionally or alternatively include processor-executable instructions of a configuration app 216, e.g., the unlock application 130, or of a configuration module 218, e.g., the unlocking module 134. As noted above, unlocking is a nonlimiting example of a configuration change used herein for clarity of description.

The terminal 202 can further include the datastore 132 communicatively connected with (e.g., accessible by) the security processor 128. The security processor 128 can access datastore 132, e.g., under control of processor-executable instructions of unlocking module 134. In some examples, the datastore is inaccessible to the application processor or other components other than the security processor 128. In some examples, the datastore 132 can be loaded with data at manufacturing or provisioning time via a dedicated interface, e.g., a JTAG interface, and then that interface is disabled to prevent future unauthorized access via that interface.

The terminal 202 can further include a user interface (UI) 220, e.g., including a display, e.g., an electronic display device, a speaker, a vibration unit, a touchscreen, or other devices for presenting information to a user and receiving commands from the user. The UI 220 can include a session-initiating user interface control, e.g., a touchscreen or physical button, to indicate a communication session should be initiated. The UI 220 or components thereof (for brevity, not depicted), e.g., the display, can be separate from the terminal 202 or integrated with the terminal 202.

The terminal 202 can further include a network interface 222 for communication via network 206. Network interface 222 can include, e.g., one or more radio(s) configured to selectively communicate wirelessly via an access network 120, or one or more transceivers (not shown) configured to selectively communicate using wired connections. In some examples, a communications interface of terminal 202 can include at least one of a network interface 222, a memory interface (e.g., for communication between processor(s) 126 or 128 and CRM 212), or a bus interface (e.g., a local bus interface or pluggable-bus interface, such as Peripheral Component Interconnect, PCI, PCI Express, PCIe, or Serial Advanced Technology Attachment, SATA).

The terminal 202 can further include a data interface 224, e.g., for communication with an identification module 136 such as a SIM card. For example, data interface 224 can include a Universal Integrated Circuit Card (UICC) connector. Application processor 126 or security processor 128 can communicate with a SIM application running on a UICC card via data interface 224.

The server 204 can include one or more computer-readable media (CRM) 226 communicatively connected with processor 228. The processor 228 can be connected with a network interface 230 permitting processor 228 to communicate via network 206. CRM 226 can be of any of the types described herein with reference to CRM 212. Processor 228 can be of any of the types described herein with reference to processors 126 or 128. Network interface 230 can be of any of the types described herein with reference to network interface 222. In some examples, a communications interface of server 204 can include at least one of network interface 230, a memory interface to CRM 226, or a bus interface.

The CRM 226 store processor-executable instructions of a request-processing module 232. The processor-executable instructions can be executed by the processors 228 to perform various functions, e.g., described herein with reference to provider services entity 108 or FIG. 1 or 10-11, or functions described from the point of view of the terminal 202 interacting with an entity performing those functions, e.g., as in FIGS. 3-9.

In some examples, processor 228 and, if required, CRM 226, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include application processor 126 with, if required, CRM 212; and security processor 128 with, if required, CRM 212.

Figure 3:
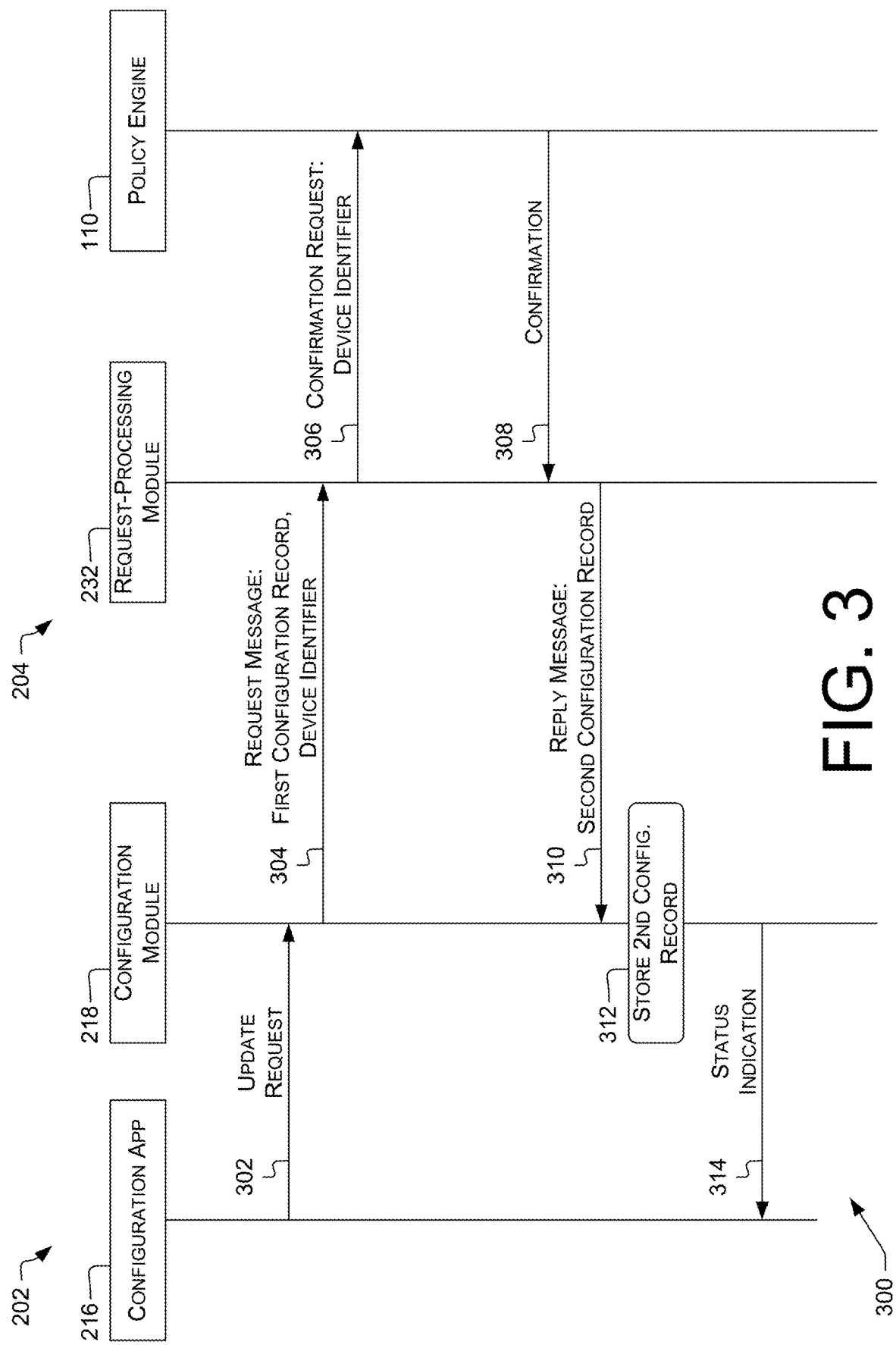
FIG. 3 shows an example call flow illustrating remote configuration updating.

FIG. 3 shows an example call flow 300 between terminal 202 and server 204. Example functions described herein with reference to FIGS. 3-11 can be performed, e.g., by configuration app 216 or configuration module 218 of terminal 202, by request-processing module 232 of server 204, by provider services entity 108 (e.g., policy engine 110, UI component 112, or unlock manager 114), or by other network devices. The illustrated division of functions between configuration app 216 and configuration module 218 is an example, and other examples can use other divisions of those functions. In the illustrated example, request-processing module 232 performs the functions of both UI component 112 and unlock manager 114.

In the illustrated example, configuration app 216 provides an update request 302, e.g., in response to user interactions with the configuration app 216 to request a temporary or permanent unlock, or another configuration change.

Configuration module 218, in response to the update request 302, prepares and sends a request message 304. The request message 304 includes a first configuration record retrieved from the datastore 132. The first configuration record can be, e.g., a configuration record 142 having parameters describing authorized users, networks, or services. The first configuration record includes a device identifier of the terminal 202, e.g., an IMEI, stored in an encrypted or tamper-evident or manner (e.g., signed using a cryptographic signature). The request message 304 includes the first configuration record, and a copy of the device identifier, e.g., as retrieved from the OS of the terminal 202. This can permit detecting attacks against the OS that may change the OS's record of the device identifier, which can in turn mitigate attempts to gain unauthorized network access.

Server 204 receives the request message 304. The request-processing module 232 determines whether the device identifier from the OS corresponds to the device identifier stored in the first configuration record. If not, the update request 302 is rejected. If the device identifiers do match, request-processing module 232 provides a confirmation request 306 to policy engine 110.

Policy engine 110 determines whether the change requested in the request message 304 are permitted under policies provided by the policy manager 138. If not, the update request 302 is rejected. If the change is permitted, policy engine 110 provides a confirmation 308 to request-processing module 232.

In response to the confirmation 308, request-processing module 232 determines a reply message 310. The reply message 310 includes a second configuration record, e.g., a configuration record 142 specifying data to be used in replacing or modifying part or all of the first configuration record included in the request message 304. The reply message 310 includes a copy of the device identifier, and a cryptographic signature or other information terminal 202 can use to determine that the copy of the device identifier has not been tampered with, and was provided by the server 204 and not an unauthorized party.

In some examples, at block 312, configuration module 218 can verify the cryptographic signature on the reply message 310, and determine that the device identifier indicated therein matches the device identifier in the first configuration record. If any of those checks fail, the update request 302 is rejected. If the device identifier matches and is validly signed by the server 204, the configuration module 218 can store the second configuration record in the datastore 132. The second configuration record can be stored alongside the first configuration record, or can replace or update the first configuration record.

Upon successful storing of the second configuration record at block 312, the configuration module 218 can provide a status indication 314 to the configuration app 216. Additionally or alternatively, the configuration module 218 can provide the status indication 314 in the event of a failure during the depicted interactions. The configuration app 216 can present the status indication 314 via the UI 220.

Figure 4:
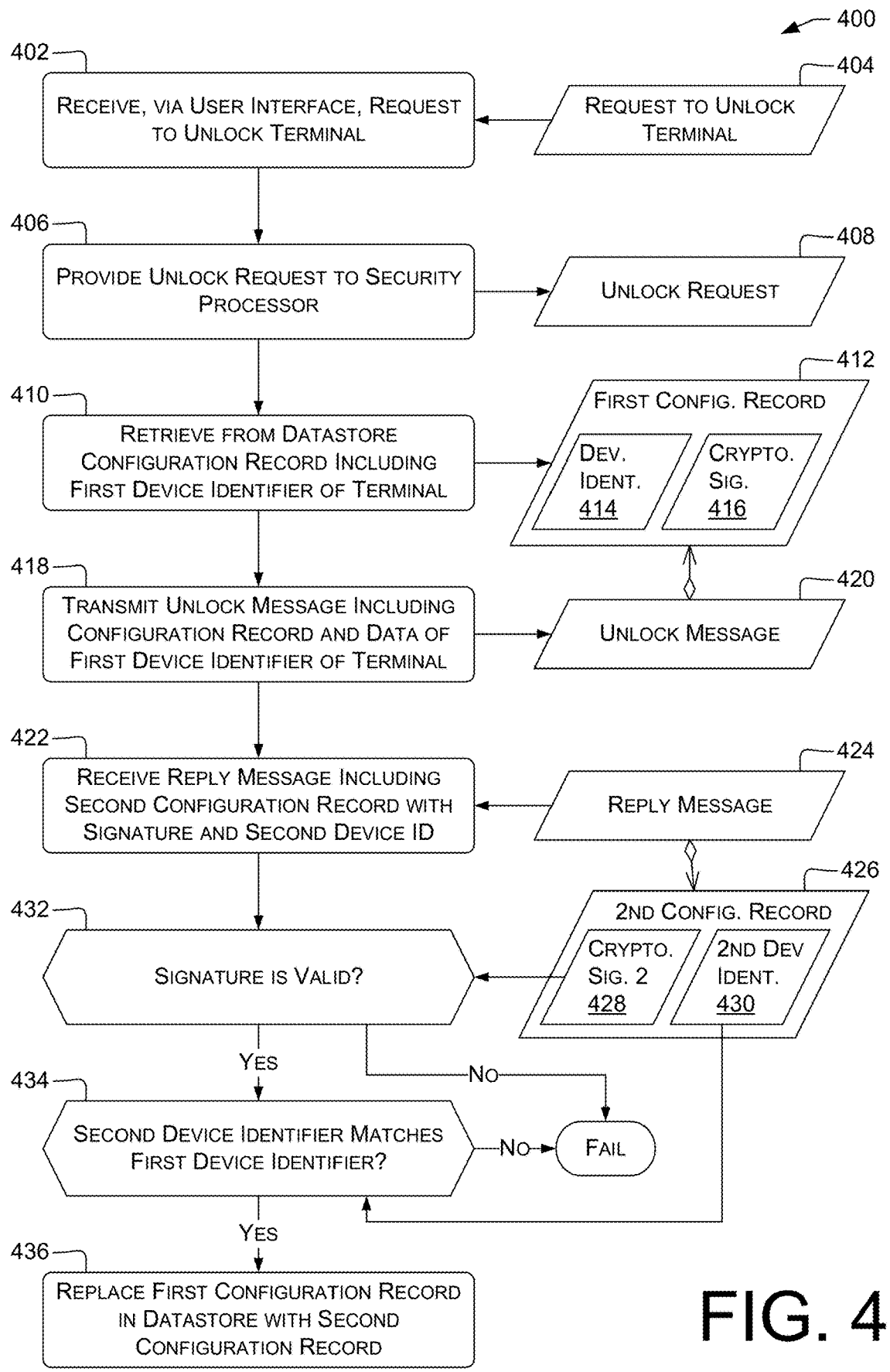
FIG. 4 is a dataflow diagram illustrating an example process for operations at a terminal during remote unlocking of the terminal.

FIG. 4 illustrates an example process 400 for processing a configuration change, e.g., a permanent or temporary unlock, and related data items. The illustrated process 400 can be carried out by a control unit, e.g., of terminal 202. In some examples, application processor 126 and security processor 128 can cooperate to perform the listed functions. In some examples, the control unit can include application processor 126, security processor 128, and any CRM 212 required to store instructions for either or both processors 126, 128.

The terminal 202 can include a network interface 222, a UI 220, and a memory storing instructions, e.g., CRM 212 or another memory. In some examples, the instruction memory and the datastore 132 can be separate computer storage devices. In other examples, the instruction memory and the datastore 132 can be separate regions, e.g., with separate access controls, of a particular computer storage device or set of devices.

The instructions can be executable by at least one of the security processor 128 or the application processor 126 to cause the security processor 128 and the application processor 126 to, in coordination, perform operations described herein. For example, each processor 126, 128 can perform some of the operations. Throughout the remainder of this discussion, described functions of terminal 202 can be performed by application processor 126, security processor 128, or both in coordination, unless a particular processor is specifically identified as performing a particular function.

Operations shown in FIG. 4 and in FIGS. 5-11, discussed below, can be performed in any order except when otherwise specified, or when data from an earlier step is used in a later step. For clarity of explanation, reference is herein made to various components, operations, and data transmissions shown in FIGS. 1-3 that can carry out or participate in the steps of the example method. It should be noted, however, that other components can be used; that is, example method(s) shown in FIGS. 4-11 are not limited to being carried out by the identified components, and are not limited to being carried out using the identified operations and data transmissions.

In some examples, at block 402, the terminal 202 can receive, via the UI 220, a request 404 to unlock the terminal. As noted above with reference to update request 302, this can be a request provided through a UI of configuration app 216.

In some examples, at block 406, in response to the request 404 to unlock the terminal, the terminal 202 can provide an unlock request 408 (e.g., update request 302) to the security processor 128. Examples are discussed herein, e.g., with reference to update request 302.

In some examples, at block 410, the security processor 128 can retrieve, from the datastore 132, a first configuration record 412 comprising a first device identifier 414 of the terminal 202 and a cryptographic signature 416 of at least a portion of (e.g., all of) the first configuration record 412. Examples are discussed herein, e.g., with reference to request message 304. The at least a portion of the first configuration record 412 can include the first device identifier 414. This can permit the provider services entity 108 to detect unauthorized alterations to the first device identifier 414 at the terminal 202. The first device identifier 414, and other device identifiers described with reference to FIGS. 4-11, can be or include an IMEI of the terminal 202, in some examples. The first configuration record 412, e.g., the at least a portion thereof, can additionally store information about services, networks, or other devices or entities authorized for use with the terminal 202, e.g., with a modem thereof.

In some examples, the cryptographic signature 416, and other cryptographic signatures herein, can be generated using private- or public-key cryptographic techniques. For example, the cryptographic signature 416 can be or include a message authentication code (MAC), e.g., keyed-hash message authentication code (HMAC). An HMAC includes the output of a hash function applied to a shared secret key and the contents of the at least a portion of the first configuration record 412. The particular arrangement is specific to the HMAC arrangement in use, and any conventional HMAC or other MAC can be used, e.g., a SHA-256 or SHA-3 HMAC.

Additionally or alternatively, the cryptographic signature 416 can be or include a public-key signature, e.g., a cryptographic hash of the contents of the at least a portion of the first configuration record 412, encrypted with the private key of the signing party. This permits the signature to be verified by any party having the public key of the signing party. Examples include RSA-SSA-PSS and other RSA or PKCS signature techniques.

In some examples, at block 418, the terminal 202 can transmit, via the network interface, an unlock message 420 (which can represent request message 304) comprising the first configuration record 412 and data of the first device identifier 414 of the terminal. As described herein with reference to request message 304, the data of the first device identifier 414 can be retrieved from the OS or other components of terminal 202, rather than being copied out of the first configuration record 412. In some examples, the first device identifier 414 in the first configuration record 412 is encrypted, and the decryption key is not present on terminal 202 or not accessible to at least one control unit thereof, e.g., to the application processor 126.

In some examples, at block 422, the terminal 202 can receive, via the network interface, a reply message 424 comprising a second configuration record 426. The second configuration record 426 can include a second cryptographic signature 428 of at least a portion of the second configuration record 426 and a second device identifier 430. The at least a portion can include the second device identifier 430. This can permit terminal 202 to verify the authenticity of the second device identifier 430 from the provider services entity 108. Examples are discussed herein, e.g., with reference to reply message 310.

In some examples, at decision block 432, the security processor 128 can verify that the second cryptographic signature 428 is valid. In response, the security processor 128 can provide a first validity indication ("Yes"). If the second cryptographic signature 428 is not valid, the second configuration record 426 can be rejected ("Fail").

In some examples, at decision block 434, the security processor 128 can verify that the second device identifier 430 matches the first device identifier 414 from the first configuration record 412. In response to successful verification, the security processor 128 can provide a second validity indication ("Yes"). If the second device identifier 430 does not match the first device identifier 414, the second configuration record 426 can be rejected ("Fail").

In some examples, at block 436, in response to a combination of the first validity indication and the second validity indication, the terminal 202, e.g., the security processor 128, can replace the first configuration record 412 in the datastore 132 with the second configuration record 426. Examples are discussed herein, e.g., with reference to block 312. In other examples discussed herein, e.g., with reference to block 312 or 630, the terminal 202 can additionally or alternatively modify the first configuration record 412 or take other actions using data of the second configuration record 426.

In some examples, decision block 432, decision block 434, and block 436 are performed by security processor 128. Provided the overall security of datastore 132 and security processor 128 is not breached, using decision block 434 can cause the device identifier indicated in the configuration record in the datastore 132 to remain unchanged, no matter how many times the configuration record is replaced (block 436). This can reduce attackers' ability to spoof devices in an attempt to disrupt, or gain unauthorized access to, network services of the provider services entity 108.

Figure 5:
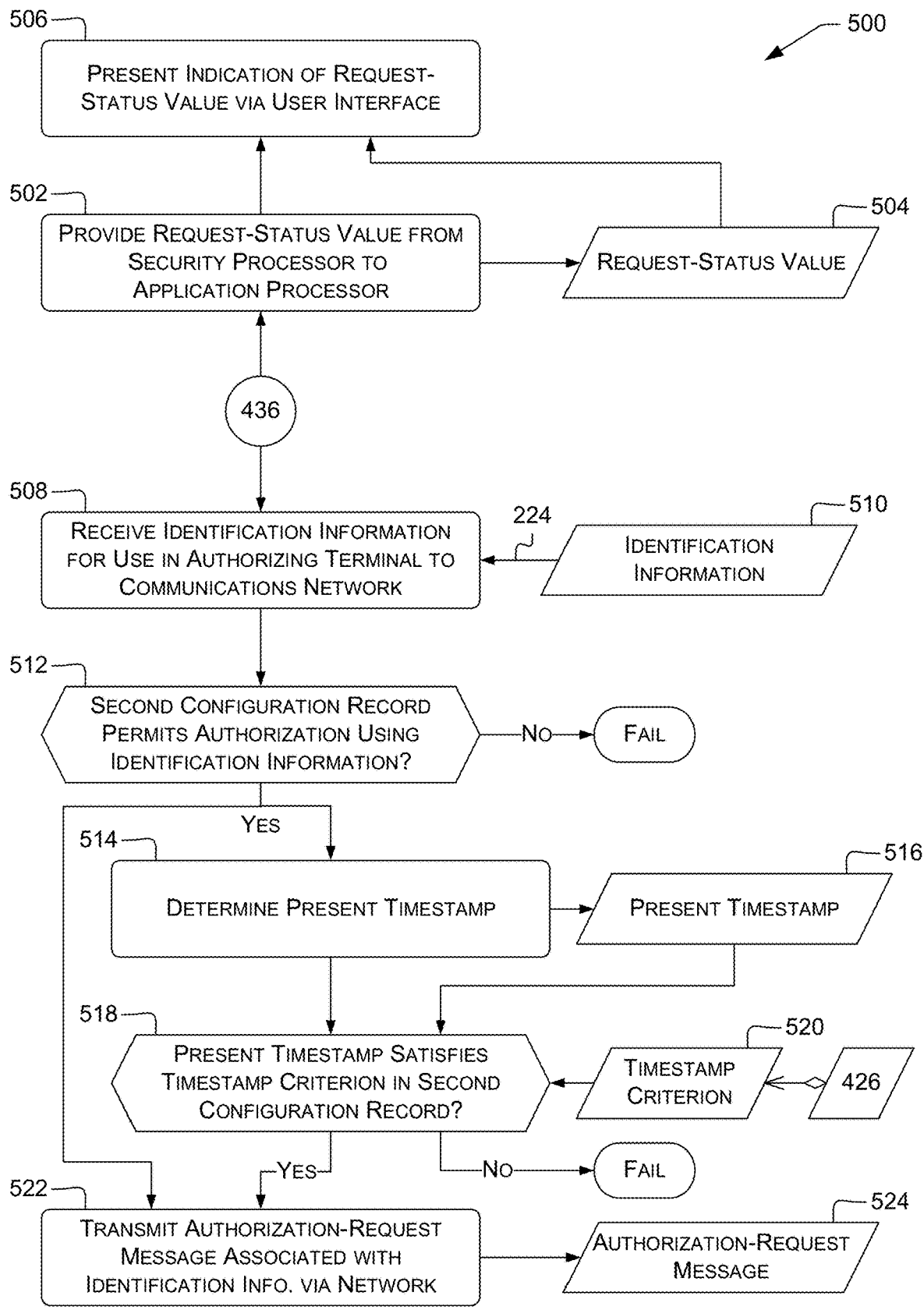
FIG. 5 is a dataflow diagram illustrating an example process for processing subsequent to unlocking the terminal.

FIG. 5 illustrates an example process 500 for processing a configuration change, e.g., a permanent or temporary unlock, and related data items. The illustrated process 500 can be carried out by a control unit, e.g., of terminal 202. In some examples, block 436 can be followed by block 502 or block 508.

In some examples, at block 502, the security processor 128 can provide a request-status value 504 to the application processor 126. The request-status value 504 can indicate that the unlock request was successful. Accordingly, block 502 can be performed subsequent to decision block 434 or block 436, e.g., after determining that the unlock request was successful. In some examples, as noted above, the policy engine 110 may grant a temporary unlock even though a permanent unlock was requested. In some such examples, and other examples, the request-status value 504 can include or indicate details of the unlock, e.g., whether the unlock is temporary or permanent, and, if temporary, when the unlock expires.

In some examples, at block 506, the application processor 126 can present, via the UI 220, an indication of the request-status value. For example, the unlock application 130 can present a dialog box, toast, notification icon, sound, or other indication of whether the request succeeded. In some examples in which policy engine 110 provides a limited number of temporary unlocks per device, the request-status value 504 can indicate the number remaining, and the application processor 126 can present that number or make that number available for users to refer to later.

In some examples, at block 508, the control unit can receive identification information 510 for use in authorizing the terminal to the communications network 144, 206. The identification information 510 can include, e.g., an IMSI, an MCC/MNC pair, a Mobile Virtual Network Operator (MVNO) Group ID (GID), or another identifier. Block 508 can include retrieving the identification information 510 from the identification module 136 via the data interface 224. For example, the control unit can retrieve the information from a UICC card, e.g., from the SIM application running thereon.

In some examples, block 508 can include detecting the identification module 136. For example, the control unit can use UICC-standard communications or other detection or device-enumeration procedures (e.g., USB device enumeration) over the data interface 224 to detect the identification module 136. In some examples, detection can be used together with, or independently of, verification of the identification information.

In some examples, at decision block 512, the security processor 128 can determine whether the second configuration record 426 permits authorization using the identification information 510. If not, processing can terminate ("Fail"). In that event, a message can be presented to the user, e.g., via unlock application 130, UI 220, or other interface components.

For example, the second configuration record 426 can include a list of MCC/MNC pairs, or GIDs, that are permitted for use in attempting to authorize to a communications network. The security processor 128 can retrieve that list from the second configuration record 426 and determine whether the identification information 510 is included in the list. Additionally or alternatively, the security processor 128 can test portions of the identification information 510, e.g., indicated by byte offsets or bitmasks, or can test an IMSI or other portion of the identification information 510 against a criterion indicated in the second configuration record 426. If the identification information 510 is authorized ("Yes"), processing can proceed to block 514 or block 522.

In some examples, e.g., a temporary unlock, timestamps are tested in addition to identification information 510. In some of these examples, decision block 512 can include blocks 514 and 518.

In some examples, at block 514, the terminal 202 can determine a present timestamp 516 ("now"), e.g., a date/time approximating the moment the timestamp is determined. For example, the terminal 202 can receive timestamps from access network 120, shortwave radio, satellite navigation systems such as GPS, an internal clock, or other sources. Timestamps can be expressed in various timekeeping systems, e.g., UNIX time, TAI, UTC, local time, network time, GPS time, or counts of nanoseconds, seconds, or other time intervals since a defined epoch.

In some examples, at block 518, the security processor 128 can determine whether the present timestamp 516 satisfies a timestamp criterion 520 included in the second configuration record 426. If not, processing can terminate ("Fail"). In that event, a message can be presented to the user, e.g., via unlock application 130, UI 220, or other interface components.

For example, the timestamp criterion 520 can indicate a start timestamp $T_1$ and an end timestamp $T_2$ of the temporary unlock period. The security processor 128 can determine that the timestamp criterion 520 is satisfied if, e.g., $T_1 \leq \text{now} < T_2$. In another example, the timestamp criterion 520 can include $T_I$ and a duration d, and the security processor 128 can determine that the timestamp criterion 520 is satisfied if, e.g., $T_1 \leq \text{now} < (T_1 + d)$.

In some examples, at block 522, the terminal 202 can transmit an authorization-request message 524 associated with the identification information 510 via the communications network 144. For example, the authorization-request message 524 can include a request to attach to an access network 120 using the identification information 510. In some examples, the authorization-request message 524 can include the identification information 510, or can include a hash or encrypted version thereof. Block 522 can be performed, e.g., in response to the determination at decision block 512 that the second configuration record 426 permits authorization using the identification information 510.

Figure 6:
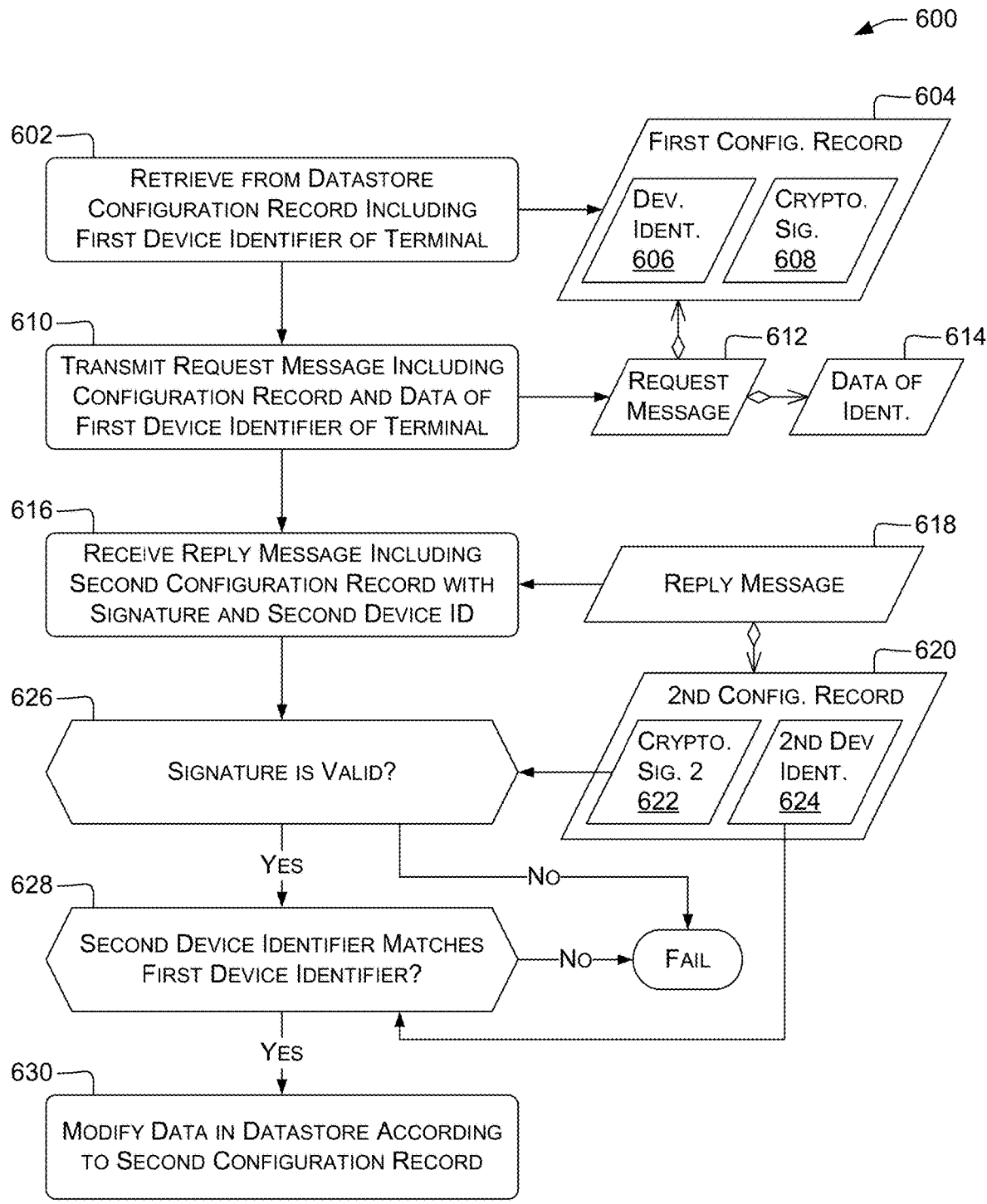
FIG. 6 is a dataflow diagram illustrating example terminal-side operations in a process of changing configuration of the terminal.

FIG. 6 illustrates an example process 600 for processing a configuration change, e.g., a permanent or temporary unlock, and related data items. The illustrated process 600 can be carried out by a control unit, e.g., of terminal 202. For example, process 600 can be carried out by security processor 128 of terminal 202. Terminal 202 can include a communications interface and a datastore 132, as discussed above.

In some examples, at block 602, terminal 202 can retrieve, from the datastore 132, a first configuration record 604 comprising a first device identifier 606 (e.g., an IMEI) of the terminal 202 and a cryptographic signature 608 of at least a portion of the first configuration record 604. The portion can include the first device identifier 606. Examples are discussed herein, e.g., with reference to block 410.

In some examples, at block 610, terminal 202 can transmit, via the communications interface, a request message 612 comprising the first configuration record 604 and data 614 of the first device identifier 606 of the terminal 202. Examples are discussed herein, e.g., with reference to block 418. As discussed above, the first configuration record 604 and the data 614 can be retrieved from different sources, e.g., datastore 132 (or another secure filesystem) and an OS of the terminal 202, respectively.

In some examples, at block 616, terminal 202 can receive, via the communications interface, a reply message 618 comprising a second configuration record 620. The second configuration record 620 can include second cryptographic signature 622 of at least a portion of the second configuration record 620. The second configuration record 620 can also include a second device identifier 624. The at least a portion of the second configuration record 620 can include the second device identifier 624. Examples are discussed herein, e.g., with reference to block 422.

In some examples, at decision block 626, the terminal 202 can verify that the second cryptographic signature 622 is valid. If the second cryptographic signature 622 is not valid, the second configuration record 620 can be rejected ("Fail"). Examples are discussed herein, e.g., with reference to decision block 432. If the verification is successful, processing can proceed ("Yes").

In some examples, at decision block 628, the terminal 202 can verify that the second device identifier 624 matches the first device identifier 606 from the first configuration record 604. If the second device identifier 624 does not match the first device identifier 606, the second configuration record 620 can be rejected ("Fail"). Examples are discussed herein, e.g., with reference to decision block 434. If the verification is successful, processing can proceed ("Yes").

In some examples, at block 630, in response to the verifications of the second cryptographic signature 622 (at decision block 626) and the second device identifier 624 (at decision block 628), the terminal 202 can modify data in the datastore 132 according to the second configuration record 620. Examples are discussed herein, e.g., with reference to block 312. For example, terminal 202 can store the second configuration record 620 in the datastore 132, replace the first configuration record 604 in the datastore 132 with the second configuration record 620, or patch the first configuration record 604 in the datastore 132 based on a diff or patch in the second configuration record 620. Additionally or alternatively, terminal 202 can modify data in the datastore 132 other than data of the first configuration record 604 according to the second configuration record 620. For example, the second configuration record 620 can include, e.g., a list of memory locations or fields in datastore 132, and changes to be made to the respective values of those locations or fields. The changes can include, e.g., erasure, replacement, or modification operations (e.g., to set or clear specific bits). This can permit changing operating parameters of terminal 202 only in response to authorized, validly-signed (second cryptographic signature 622) second configuration records 620. This can provide increased flexibility in network deployment, provisioning, upgrading, and operation, while reducing the risk of malicious misconfiguration by attackers.

In some examples, block 630 can be followed by block 602 or 610. In this way, multiple configuration updates can be processed. As noted above, in at least some examples in which second configuration record 620 replaces first configuration record 604 in datastore 132, the use of device identifiers 606, 614, and 624, and verification operations carried out at decision blocks 626 and 628, can provide consistent reporting of a device's identifier.

Figure 7:
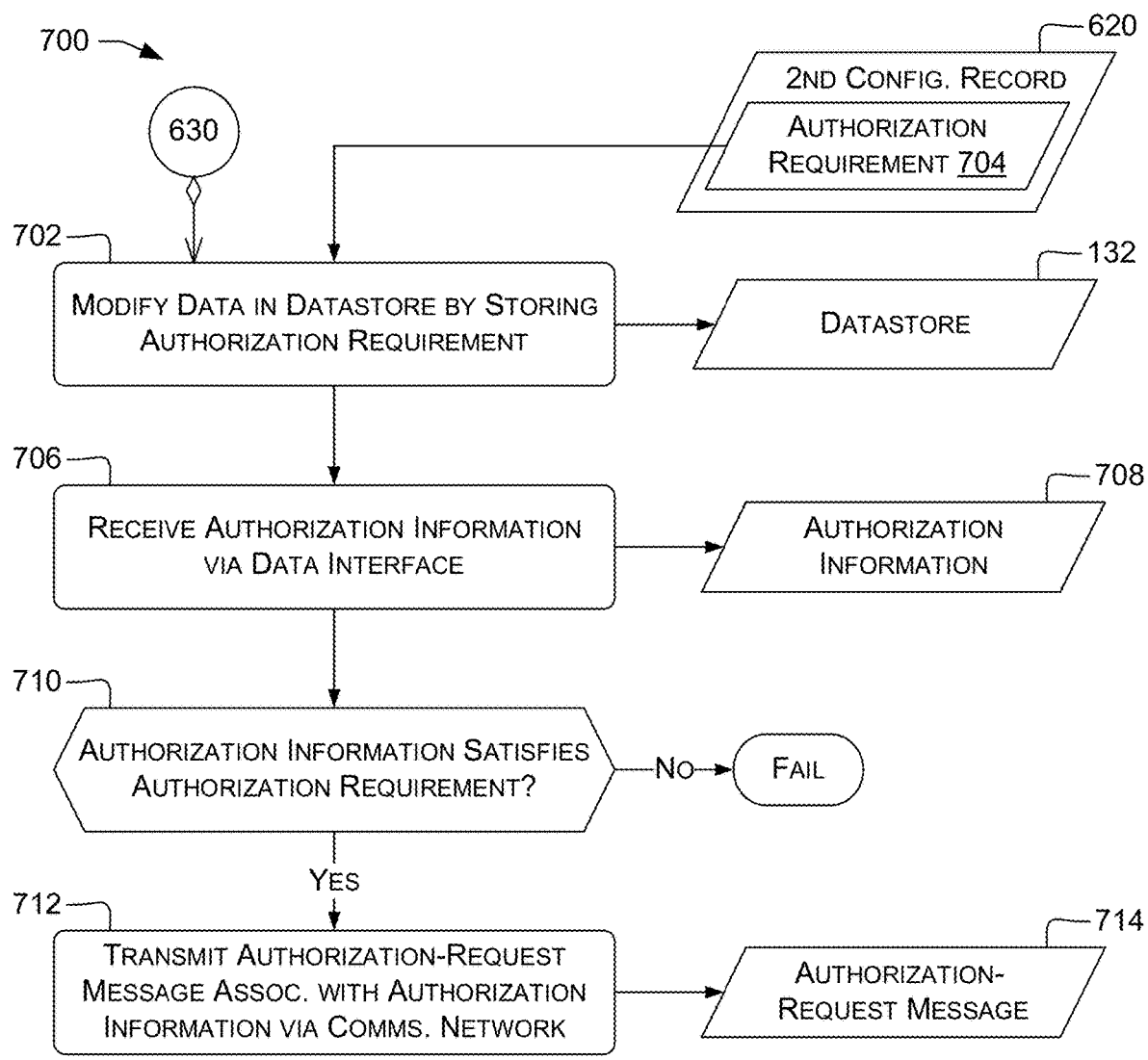
FIG. 7 is a dataflow diagram illustrating example terminal-side operations during or after changing configuration of the terminal.

FIG. 7 illustrates an example process 700 for processing a configuration change, e.g., a permanent or temporary unlock, and related data items. The illustrated process 700 can be carried out by a control unit, e.g., of terminal 202, for example, a security processor 128 thereof. In some examples, the terminal 124 can include a data interface 224, FIG. 2. In some examples, decision block 628 or block 630 can be followed by block 702, or (as depicted) block 630 can include block 702 and be followed by block 706.

In some examples, at block 702, the terminal 202 can modify the data in the datastore 132 at least partly by storing an authorization requirement 704 of the second configuration record 620 in the datastore 132. In some examples, an authorization requirement of the first configuration record 604 can be replaced by authorization requirement 704 in datastore 132. For example, the authorization requirement 704 can include at least one MCC/MNC pair, at least one GID, or other value(s) indicating access authorizations (e.g., port numbers, network addresses, domain names, or other identifiers).

Authorizations can express "permit" or "deny" relationships. For example, authorization requirement 704 can specify that MCC/MNC 310/300 is authorized ("permit"), and that MCC/MNC 001/01 is not authorized ("deny"). In some examples, authorization requirement 704 can include a default access rule, e.g., "permit access unless specifically denied," or "deny access unless specifically permitted." In some examples, authorization requirement 704 can include at least one access control list (ACL).

In some examples, at block 706, the terminal 202 can receive authorization information 708, e.g., via the data interface 224. For example, the authorization information 708 can include an IMSI, MCC/MNC pair of a user's home network, or other identifiers comparable with identifiers referenced by the authorization requirement 704. In some examples, authorization information 708 can be retrieved from memory by a CPU or memory controller, or retrieved in other ways than via the data interface 224.

In some examples, terminal 202 can include or be communicatively connected with an identification module 136 communicatively connectable with the terminal 202 (e.g., a control unit thereof) via the data interface 224. In some of these examples, the terminal 202 can retrieve the authorization information 708 from the identification module via the data interface. For example, block 706 can include communicating with a SIM or USIM application on a UICC card.

In some examples, at decision block 710, the terminal 202 can determine whether the authorization information 708 satisfies the authorization requirement 704 of the second configuration record 620, e.g., by comparison with data stored in datastore 132. For example, terminal 202 can check an MCC/MNC pair in authorization information 708 against one or more authorized MCC/MNC pairs in authorization requirement 704. If not, processing can terminate ("No"). If the authorization information 708 satisfies the authorization requirement 704, decision block 710 can be followed by block 712 ("Yes").

In some examples, at block 712, in response to the determination at decision block 710, the terminal 202 can transmit an authorization-request message 714 associated with the authorization information 708 via the communications network 144. Examples are discussed herein, e.g., with reference to authorization-request message 524. Some examples using blocks 702-712 can restrict the ability of attackers to use unauthorized credentials to improperly access a network.

Figure 8:
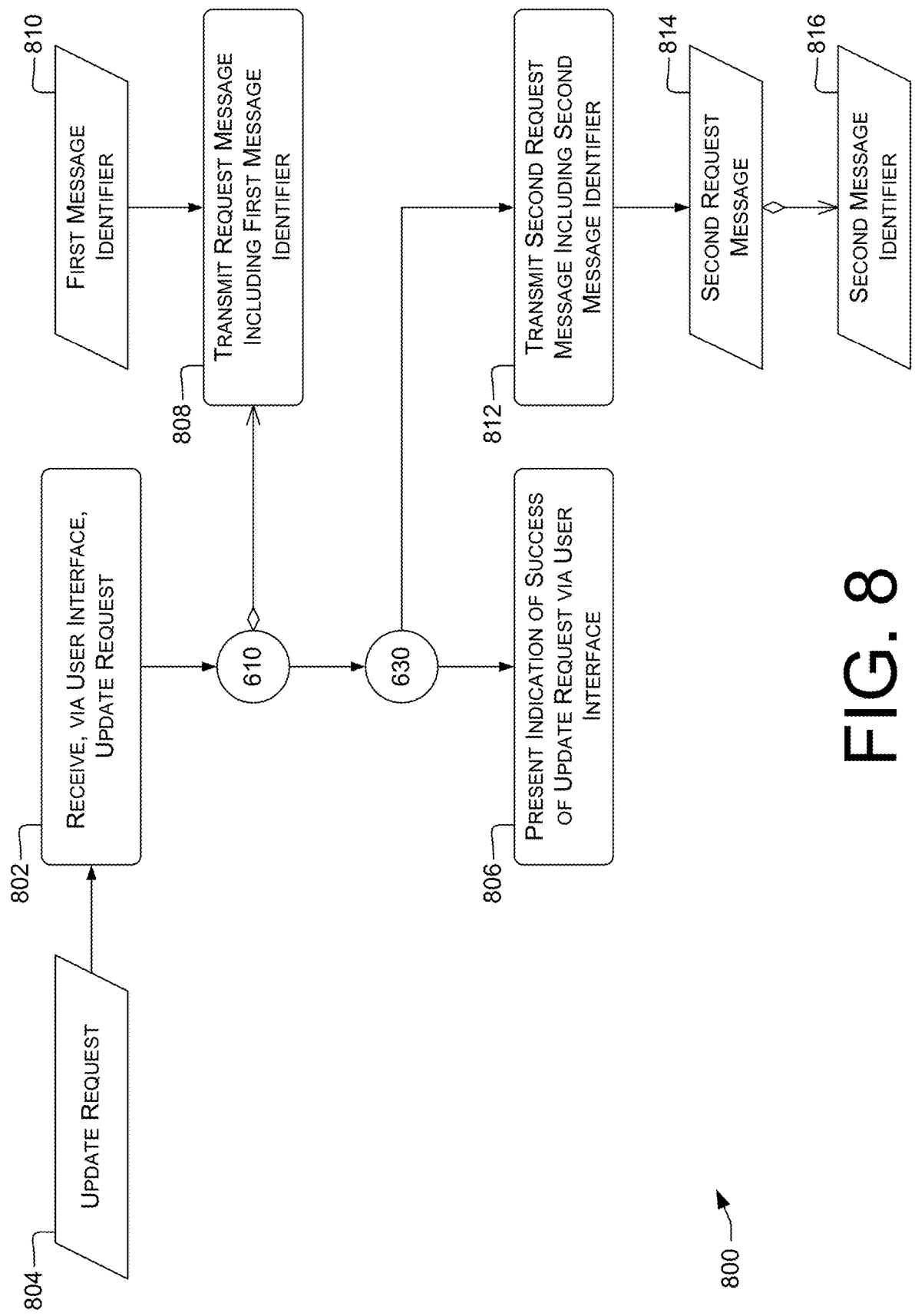
FIG. 8 is a dataflow diagram illustrating example terminal-side operations in a process of changing configuration of the terminal.

FIG. 8 illustrates an example process 800 for processing a configuration change, e.g., a permanent or temporary unlock, and related data items. The illustrated process 800 can be carried out by a control unit, e.g., of terminal 202, for example, an application processor 126 or security processor 128 thereof. In some examples, the terminal 202 includes a UI 220, FIG. 2. In some examples, block 802 can be followed by block 610, block 610 can include block 808, or block 630 can be followed by block 806 or 812. In some examples, both of blocks 802 and 806 are used. In some examples, both of blocks 808 and 812 are used.

In some examples, at block 802, terminal 202 can receive, via the UI 220, an update request 804. The update request 804 can be a request for a permanent or temporary unlock, a request for a permissions or authorization change, a request to add or remove permitted services or network peers (e.g., for parental controls), or another update request. Examples are discussed herein, e.g., with reference to update request 302 and block 402. In some examples, in response to the update request, terminal 202 can transmit the request message 612 (block 610). Examples are discussed herein, e.g., with reference to blocks 402 and 406.

In some examples, at block 806, terminal 202 can present, via the UI 220, an indication that the update request 804 was successful. Block 806 can be performed, e.g., after modifying the data in the datastore 132 according to the second configuration record 620 (block 630). Examples are discussed herein, e.g., with reference to block 506.

In some examples, at block 808, terminal 202 can transmit the request message 612 further comprising a first message identifier 810. The first message identifier 810 can include, e.g., a nonce or sequence number.

In some examples, at block 812, e.g., after modifying the data in the datastore, terminal 202 can transmit a second request message 814, e.g., associated with a second update request. The second request message 814 can include the second configuration record 620, data of the second device identifier 624, and a second message identifier 816. The second message identifier 816 can be different from the first message identifier 810. For example, the second message identifier 816 can include a second nonce or a second sequence number. The use of message identifiers 810, 816 can permit provider services entity 108 to reject attempts by an attacker to replay the request message 612. For example, provider services entity 108 can record nonces already received, or the current position in a sequence number space, and reject request messages attempting to reuse nonces or rewind in the sequence number space. This can reduce the effectiveness of replay attacks against the network.

Figure 9:
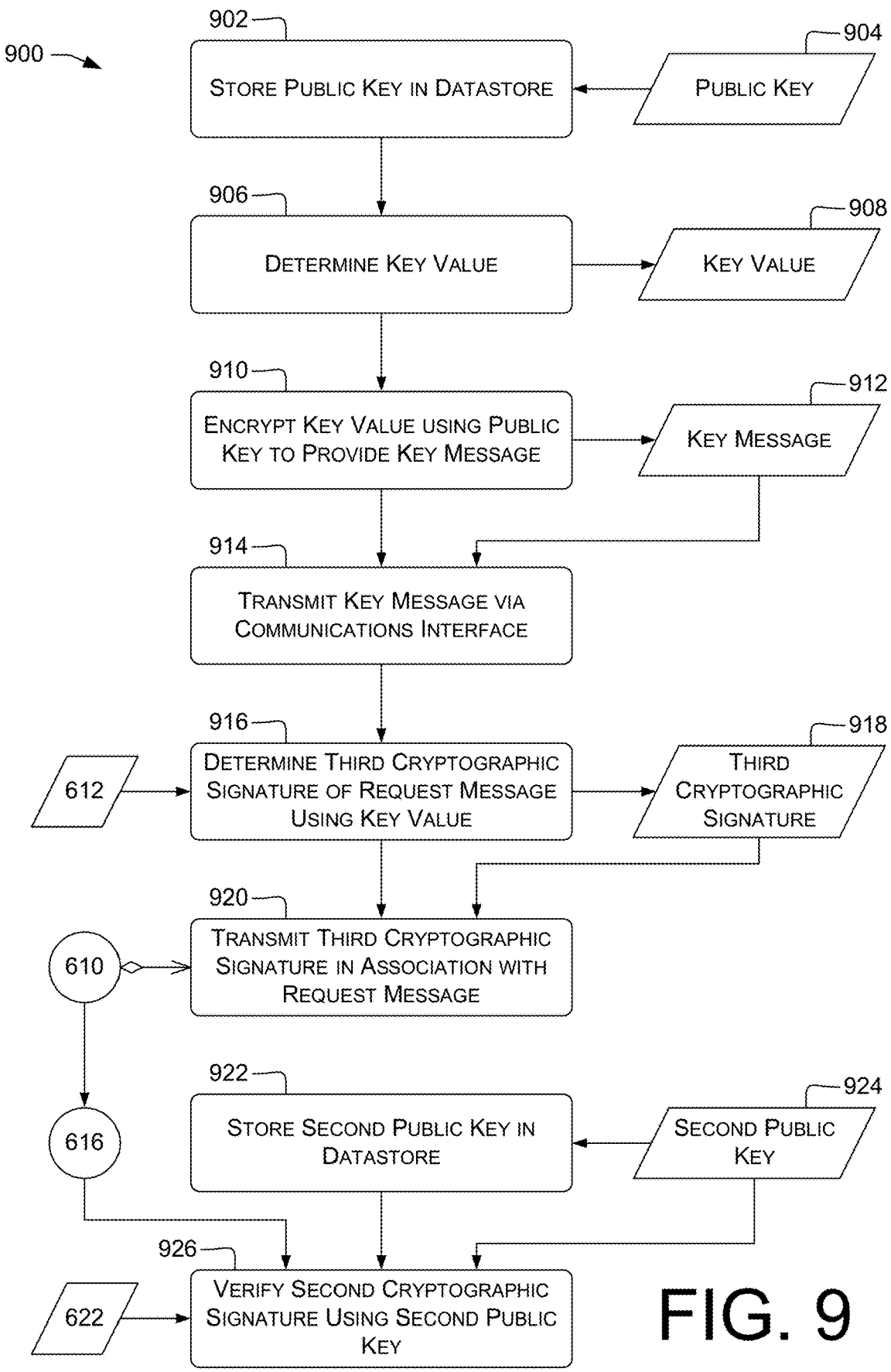
FIG. 9 is a dataflow diagram illustrating example terminal-side operations for verification of messages in a process of changing configuration of the terminal.

FIG. 9 illustrates an example process 900 for processing a configuration change, e.g., a permanent or temporary unlock, and related data items. The illustrated process 900 can be carried out by a control unit, e.g., of terminal 202, for example, a security processor 128 thereof. In some examples, blocks 902-920 can be performed in the listed order. In some examples, blocks 902-916 can precede block 610. In some examples, block 610 can include or be preceded or followed by block 920. In some examples, block 616 can be preceded or followed by block 922. In some examples, block 616 can be followed by block 926.

In some examples, at block 902, the terminal 202 can store, in the datastore 132, a public key 904. For example, at manufacturing or provisioning time, the provider of terminal 202, e.g., by or in coordination with the provider services entity 108, can load the public key 904 into the datastore 132, e.g., using a dedicated interface such as that described herein with reference to datastore 132.

In some examples, at block 906, the terminal 202 can determine a key value 908. Block 906 can be performed, e.g., on initial power-up of the terminal 202 after provisioning, on a timer, or on another schedule For example, the terminal can determine a cryptographically-strong random number, e.g., of 256 bits or more. In some examples, the key value 908 can be stored in datastore 132 or another secure filesystem that effectively prevents the key value 908 from being retrieved from terminal 202 by unauthorized parties after deployment.

In some examples, at block 910, the terminal 202 can encrypt the key value 908 using the public key 904 to provide a key message 912. For example, the terminal 202 can encrypt the key value 908 using a public-key or hybrid cryptosystem such as RSA, TLS, or OPENPGP.

In some examples, at block 914, the terminal 202 can transmit the key message 912 via the communications interface. Since the key message 912 is encrypted, the key value 908 can be transferred securely from the terminal 202 to the provider services entity 108.

In some examples, at block 916, the terminal 202 can determine a third cryptographic signature 918 of the request message 612 using the key value 908. For example, the terminal 202 can determine the third cryptographic signature 918 comprising a MAC (e.g., an HMAC) of the request message 612 with respect to the key value 908.

In some examples, at block 920, the terminal 202 can transmit the third cryptographic signature 918 via the communications interface in association with (e.g., as part of, alongside, or in a separate transmission linked to) the request message 612. This can permit the provider services entity 108 to verify that the request message 612 is from the terminal 202 and not from another terminal, e.g., under control of an attacker and being used to spoof the first device identifier 606.

In some examples, at block 922, the terminal 202 can store, in the datastore 132, a second public key 924 different from the public key 904. Examples are discussed herein, e.g., with reference to block 902.

In some examples, at block 926, the terminal 202 can verify that the second cryptographic signature 622 is valid using the second public key 924. This can reduce the ability of attackers to spoof the provider services entity 108 and gain unauthorized access to terminal 202. Using separate public keys 904, 924 can reduce the risk of system damage or intrusion in the event that one of the public keys 904, 924 is compromised.

Some examples include at least one computer-readable medium, e.g., CRM 212, comprising instructions. When the instructions executed by at least one processor (e.g., application processor 126 or security processor 128), they cause the at least one processor to perform operations described herein. The at least one processor can, e.g., retrieve, from a datastore, a configuration record comprising a device identifier of a terminal and a cryptographic signature of at least a portion of the configuration record (block 410, 602). The at least one processor can transmit, via a communications interface, a request message comprising the configuration record and the device identifier of the terminal (block 418, 610). The at least one processor can receive, via the communications interface, a reply message comprising a second configuration record, wherein the second configuration record includes a second device identifier and a second cryptographic signature of at least a portion of the second configuration record (block 422, 616). The at least one processor can verify that the second cryptographic signature is valid (decision block 432, 626). The at least one processor can verify that the second device identifier matches the device identifier (decision block 434, 628). The at least one processor can, in response to the verifications of the second cryptographic signature and the second device identifier, modify data in the datastore according to the second configuration record, e.g., by storing the second configuration record in the datastore (block 436, 630).

In some examples, the second configuration record can include an authorization requirement. The at least one processor can receive authorization information from an identification module (block 508, 706). The at least one processor can determine that the authorization information satisfies the authorization requirement (decision block 512, 710). The at least one processor can, in response, transmit an authorization-request message associated with the authorization information to an access-control device of a communications network (block 522, 712).

In some examples, the second configuration record comprises a timestamp criterion. The at least one processor can detect an identification module (e.g., as discussed herein with reference to blocks 508 or 706). The at least one processor can determine a present timestamp (block 514). The at least one processor can determine that the identification module is authorized for use with the at least one processor based at least in part on the present timestamp satisfying the timestamp criterion (decision block 518).

In some examples, the at least one processor can transmit the authorization request in response to: the authorization information satisfying the authorization requirement; the present timestamp satisfying the timestamp criterion; or both the authorization information satisfying the authorization requirement and the present timestamp satisfying the timestamp criterion. In some examples, the determination whether the present timestamp satisfies the timestamp criterion can be carried out as a separate operation from the determining that the identification module is authorized for use based on the timestamp.

Figure 10:
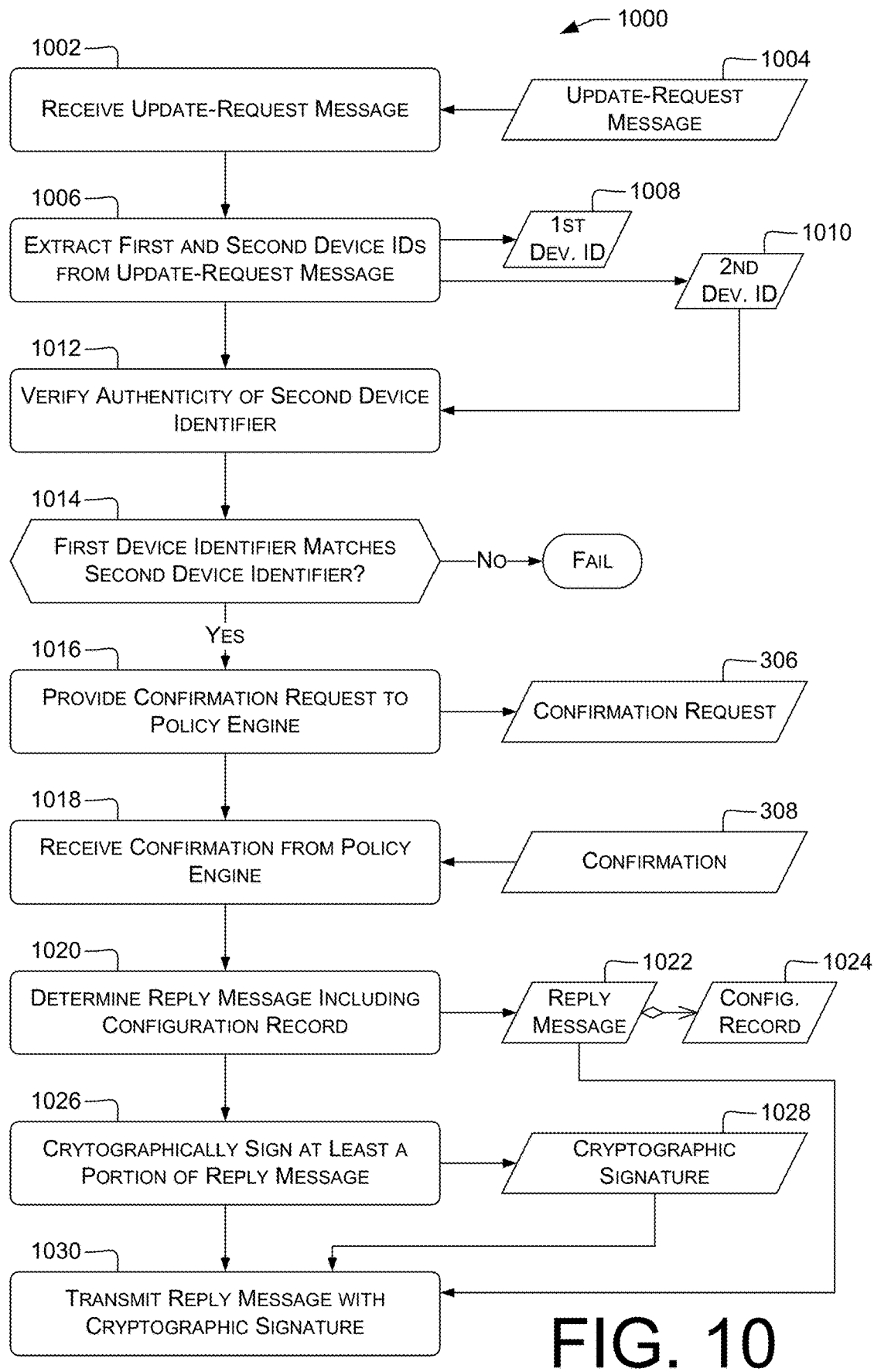
FIG. 10 is a dataflow diagram illustrating example server-side operations in a process of changing configuration of the terminal.

FIG. 10 illustrates an example process 1000 for validating a configuration change, e.g., a permanent or temporary unlock, and related data items. The illustrated process 1000 can be carried out by a control unit, e.g., of a provider services entity 108 or other network device(s). For example, process 1000 can be carried out by UI 112 (e.g., app backend 140) or unlock manager 114, acting singly or in coordination, or a component that combines functions of UI 112 (e.g., app backend 140) and unlock manager 114. Various examples of operations of process 1000 are described herein with reference to the request-processing module 232 and the policy engine 110, FIG. 3.

In some examples, at block 1002, the control unit can receive, via a communications interface, an update-request message 1004, which can represent request message 304, unlock request 408, or request message 612. The update-request message 1004 can be or include, e.g., a request for a temporary or permanent unlock, or another configuration change as described herein.

In some examples, at block 1006, the control unit can extract a first device identifier 1008 and a second device identifier 1010 from the update-request message 1004. For example, the control unit can retrieve the first device identifier 1008 from a cleartext portion of the update-request message 1004. The control unit can retrieve the second device identifier 1010 from a configuration record (e.g., first configuration record 412, 604) in the update-request message 1004 or another portion of the update-request message 1004. In some examples using first configuration records 412, 604 stored in an encrypted form, block 1006 can include decrypting the first configuration record 412, 604 and extracting the second device identifier 1010 from the resulting plaintext.

In some examples, at block 1012, the control unit can verify authenticity of the second device identifier 1010 from the update-request message 1004. For example, the control unit can check a MAC or public-key signature of data including the second device identifier. In some examples using a MAC or signature of at least a portion of the first configuration record 412, 604 including the second device identifier 1010, the control unit can verify that MAC or signature. For example, the control unit can verify an HMAC or other third cryptographic signature 918 based on key value 908 known only to terminal 202 and provider services entity 108, e.g., using RSA signature validation, by forming an HMAC and comparing it to an HMAC in update-request message 1004 (e.g., third cryptographic signature 918), or using signature-verification algorithms from other families described herein.

In some examples, at decision block 1014, the control unit can determine whether the first device identifier 1008 matches the second device identifier 1010. If not, the control unit can transmit a message to the terminal 202 to advise the terminal 202 that the request indicated in the update-request message 1004 has failed ("Fail"). If the first device identifier 1008 matches the second device identifier 1010, decision block 1014 can be followed by block 1016.

In some examples, at block 1016, the control unit can provide, to a policy engine 110, a confirmation request 306. Examples are discussed herein, e.g., with reference to FIG. 3. For example, the confirmation request 306 can include identification information of the terminal 202, e.g., second device identifier 1010, information of the requested configuration changes, or other information relating to the terminal or user account(s) associated with the terminal.

In some examples, at block 1018, the control unit can receive, from the policy engine 110, a confirmation 308. If the control unit does not receive confirmation 308, or receives an "update denied" message from the policy engine 110, the control unit can transmit a failure message as noted above with reference to decision block 1014 ("Fail").

In some examples, at block 1020, in response to the confirmation, the control unit can determine a reply message 1022, which can represent reply message 310, 424, or 618. Reply message 1022 can include the device identifier and a configuration record 1024, which can represent second configuration record 426 or 620.

In some examples, at block 1026, the control unit can cryptographically sign at least a portion of the reply message 1022 to provide a cryptographic signature 1028, which can represent second cryptographic signature 428, 622, or another signature described herein with reference to block 926. The at least a portion of the reply message 1022 can include the first device identifier 1008 (or the second device identifier 1010, since they have already been determined to match at decision block 1014).

In some examples, at block 1030, the control unit can transmit, via the communications interface, the reply message 1022 in association with the cryptographic signature 1028. The terminal 202 can then receive the reply message 1022 in and the cryptographic signature 1028 and carry out processing such as that described herein with reference to blocks 422 et seq. (including FIG. 5), 616 et seq. (including FIG. 7), 806, 812, or 926.

In some examples of process 1000, the control unit does not communicate with an attestation server. Some prior schemes use an attestation server separate from a provider entity, or otherwise separate from a control unit processing requests, to determine whether a telecommunications device has been tampered with. Some examples herein use decision block 1014, and corresponding functions at terminal 202 described herein, to permit detecting tampering without communicating with, or requiring communication with, an attestation server. This can permit responding more rapidly to update-request messages 1004, and can reduce the number of possible points of failure that might inhibit processing of any particular update-request message 1004.

Figure 11:
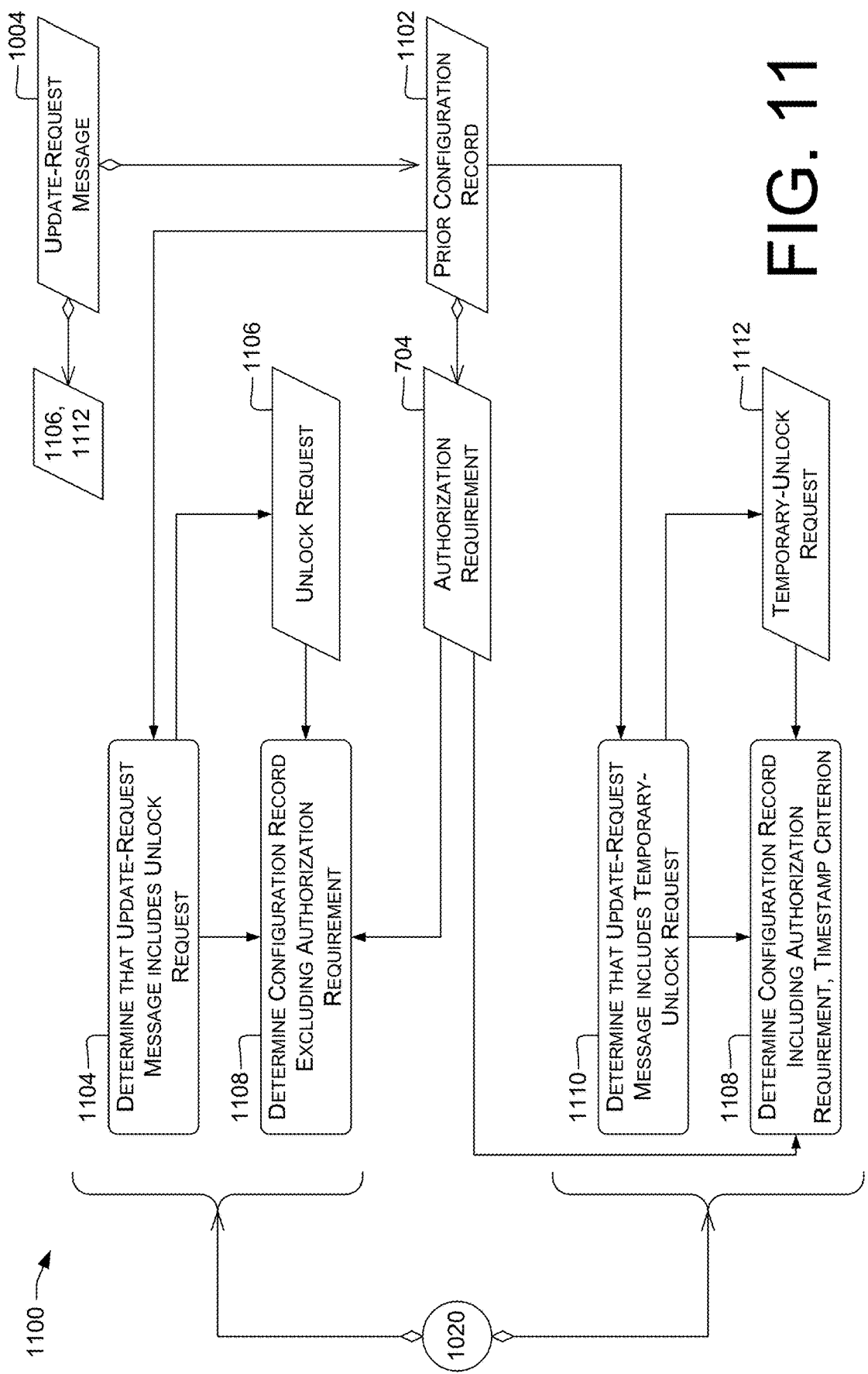
FIG. 11 is a dataflow diagram illustrating example server-side operations in a process of determining a configuration record to be provided to a terminal.

FIG. 11 illustrates an example process 1100 for validating a configuration change, e.g., a permanent or temporary unlock, and related data items. The illustrated process 1100 can be carried out by a control unit, e.g., of a provider services entity 108 or other network device(s). In some examples, block 1020 can include or be followed by blocks 1104 and 1108, or by blocks 1110 and 1114, or by either pair, depending on the type of unlock request as discussed below.

In some examples of process 1100, the update-request message 1004 can include a prior configuration record 1102, the configuration record as it existed prior to the requested configuration update. Prior configuration record 1102 can represent first configuration record 412 or 604. Prior configuration record 1102 can include an authorization requirement 704, e.g., an MCC/MNC pair, a GID, or other requirements described herein with reference to FIG. 7.

In some examples, at block 1104, the control unit can determine that the update-request message 1004 comprises an unlock request 1106. For example, the control unit can check the value of a request-type field of the update-request message 1004 for a predetermined value indicating an unlock request 1106.

In some examples, at block 1108, in response to the update-request message 1004 including the unlock request 1106, the control unit can determine the configuration record 1024 excluding the authorization requirement 704. In some examples, this operation is contingent upon successful verification at decision block 1014 and upon receipt of a confirmation 308 at block 1018.

In some examples, the control unit can determine the configuration record 1024 by, e.g., changing values to indicate that a lock is no longer being applied, remove one or more "deny" rules, or add a wildcard "permit" MCC/MNC pair or other identification information.

In some examples, at block 1110, the control unit can determine that the update-request message 1004 comprises a temporary-unlock request 1112. Examples are discussed herein, e.g., with reference to block 1104.

In some examples, at block 1114, in response to the update-request message 1004 comprising the temporary-unlock request 1112, the control unit can determine the configuration record 1024 still including the authorization requirement 704. The control unit can determine the configuration record 1024 further including a timestamp criterion 520 indicating a time period during which the authorization requirement 704 should not be enforced. For example, the timestamp criterion 520 can include UNIX start-time and duration values of the time period, or other specifications of the time period described herein with reference to decision block 518.

Example Clauses

A: A terminal for telecommunication, the terminal comprising: a security processor; a datastore accessible by the security processor; a network interface configured to transmit and receive messages via a telecommunications network; a user interface; an application processor communicatively connectable with the security processor; and a memory storing instructions executable by at least one of the security processor or the application processor to cause the security processor and the application processor to, in coordination, perform operations comprising: receiving, via the user interface, a request to unlock the terminal; and in response, providing an unlock request to the security processor; retrieving, from the datastore, by the security processor, a first configuration record comprising a first device identifier of the terminal and a cryptographic signature of at least a portion of the configuration record; transmitting, via the network interface, an unlock message comprising the first configuration record and data of the first device identifier of the terminal; receiving, via the network interface, a reply message comprising a second configuration record, wherein the second configuration record includes a second device identifier and a second cryptographic signature of at least a portion of the second configuration record; verifying, by the security processor, that the second cryptographic signature is valid, and providing, in response, a first validity indication; verifying, by the security processor, that the second device identifier matches the first device identifier, and providing, in response, a second validity indication; and in response to a combination of the first validity indication and the second validity indication, replacing the first configuration record in the datastore with the second configuration record.

B: The terminal according to paragraph A, wherein the operations further comprise: receiving identification information for use in authorizing the terminal to the communications network; determining, by the security processor, that the second configuration record permits authorization using the identification information; and in response, transmitting an authorization-request message associated with the identification information via the communications network.

C: The terminal according to paragraph B, wherein the operations further comprise: determining a present timestamp; and determining, by the security processor, that the present timestamp satisfies a timestamp criterion included in the second configuration record.

D: The terminal according to any of paragraphs A-C, wherein the operations further comprise: providing, by the security processor to the application processor, a request-status value indicating that the unlock request was successful; and presenting via the user interface, by the application processor, an indication of the request-status value.

E: The terminal according to any of paragraphs A-D, wherein the datastore is inaccessible to the application processor.

F: The terminal according to any of paragraphs A-E, wherein the device identifier comprises an International Mobile Equipment Identity (IMEI) of the terminal.

G: Telecommunication apparatus, comprising: a communications interface configured to transmit and receive messages via a telecommunications network; a datastore; and a control unit communicatively connected with the communications interface and the datastore and configured to: retrieve, from the datastore, a first configuration record comprising a first device identifier of the terminal and a cryptographic signature of at least a portion of the first configuration record; transmit, via the communications interface, a request message comprising the first configuration record and data of the first device identifier of the terminal; receive, via the communications interface, a reply message comprising a second configuration record, wherein the second configuration record includes a second device identifier and a second cryptographic signature of at least a portion of the second configuration record; verify that the second cryptographic signature is valid; verify that the second device identifier matches the first device identifier; and in response to the verifications of the second cryptographic signature and the second device identifier, modifying data in the datastore according to the second configuration record.

H: The apparatus according to paragraph G, wherein: the system further comprises a data interface; the second configuration record includes an authorization requirement; and the control unit is further configured to: modify the data in the datastore at least partly by storing the authorization requirement in the datastore; receive authorization information via the data interface; determine that the authorization information satisfies the authorization requirement of the second configuration record; and in response, transmit an authorization-request message associated with the authorization information via the communications network.

I: The apparatus according to paragraph G or H wherein: the apparatus further comprises an identification module communicatively connectable with the control unit via the data interface; and the control unit is configured to retrieve the authorization information from the identification module via the data interface.

J: The apparatus according to any of paragraphs G-I, wherein: the apparatus further comprises a user interface; and the control unit is further configured to: receive, via the user interface, an update request; transmit the request message in response to the update request; and after modifying the data in the datastore, present, via the user interface, an indication that the update request was successful.

K: The apparatus according to any of paragraphs G-J, wherein the control unit is further configured to, in order: store, in the datastore, a public key; determine a key value; encrypt the key value using the public key to provide a key message; transmit the key message via the communications interface; determine a third cryptographic signature of the request message using the key value; and transmit the third cryptographic signature via the communications interface in association with the request message.

L: The apparatus according to paragraph K, wherein: the control unit is further configured to store, in the datastore, a second public key different from the public key; and the control unit is configured to verify that the second cryptographic signature is valid using the second public key.

M: The apparatus according to any of paragraphs G-L, wherein the control unit is further configured to: transmit the request message further comprising a first message identifier; and after modifying the data in the datastore, transmit a second request message comprising: the second configuration record; data of the second device identifier; and a second message identifier; wherein the second message identifier is different from the first message identifier.

N: At least one computer-readable medium comprising instructions that, when executed by at least one processor, cause the at least one processor to: retrieve, from a datastore, a configuration record comprising a device identifier of a terminal and a cryptographic signature of at least a portion of the configuration record; transmit, via a communications interface, a request message comprising the configuration record and the device identifier of the terminal; receive, via the communications interface, a reply message comprising a second configuration record, wherein the second configuration record includes a second device identifier and a second cryptographic signature of at least a portion of the second configuration record; verify that the second cryptographic signature is valid; verify that the second device identifier matches the device identifier; and in response to the verifications of the second cryptographic signature and the second device identifier, modify data in the datastore according to the second configuration record.

O: The at least one computer-readable medium according to paragraph N, wherein: the second configuration record comprises an authorization requirement; and the instructions, when executed by the at least one processor, cause the at least one processor to: receive authorization information from an identification module; determine that the authorization information satisfies the authorization requirement; and in response, transmit an authorization-request message associated with the authorization information to an access-control device of a communications network.

P: The at least one computer-readable medium according to paragraph N or O, wherein: the second configuration record comprises a timestamp criterion; and the instructions, when executed by the at least one processor, cause the at least one processor to: detect an identification module; determine a present timestamp; and determine that the identification module is authorized for use with the at least one processor based at least in part on the present timestamp satisfying the timestamp criterion.

Q: A method comprising, by a control unit of a network device: receiving, via a communications interface, an update-request message; extracting a first device identifier and a second device identifier from the update-request message; verifying authenticity of a second device identifier from the update-request message; determining that the first device identifier matches the second device identifier; in response, providing, to a policy engine, a confirmation request; receiving, from the policy engine, a confirmation; in response to the confirmation, determining a reply message comprising the device identifier and a configuration record; cryptographically signing at least a portion of the reply message to provide a cryptographic signature, wherein the at least a portion of the reply message comprises the first device identifier; and transmitting, via the communications interface, the reply message in association with the cryptographic signature.

R: The method according to paragraph Q, wherein: the update-request message comprises a prior configuration record; the prior configuration record comprises an authorization requirement; and the method further comprises, by the control unit of the network device: determining that the update-request message comprises an unlock request; and in response, determining the configuration record excluding the authorization requirement.

S: The method according to paragraph Q or R, wherein: the update-request message comprises a prior configuration record; the prior configuration record comprises an authorization requirement; and the method further comprises, by the control unit of the network device: determining that the update-request message comprises a temporary-unlock request; and in response, determining the configuration record comprising: the authorization requirement; and a timestamp criterion indicating a time period during which the authorization requirement should not be enforced.

T: The method according to any of paragraphs Q-S, wherein the control unit does not communicate with an attestation server.

U: A computer-readable medium, e.g., a computer storage medium, having thereon computer-executable instructions, the computer-executable instructions upon execution configuring a computer to perform operations as any of paragraphs A-F, G-M, N-P or Q-T recites.

V: A device comprising: a processor; and a computer-readable medium, e.g., a computer storage medium, having thereon computer-executable instructions, the computer-executable instructions upon execution by the processor configuring the device to perform operations as any of paragraphs A-F, G-M, N-P or Q-T recites.

W: A system comprising: means for processing; and means for storing having thereon computer-executable instructions, the computer-executable instructions including means to configure the system to carry out a method as any of paragraphs A-F, G-M, N-P or Q-T recites.

Conclusion

In the figures, example data transmissions (parallelograms), example data exchanges in call flow diagrams, and example blocks in process diagrams represent one or more operations that can be implemented in hardware, software, or a combination thereof to transmit or receive described data or conduct described exchanges. In the context of software, the illustrated blocks and exchanges represent processor-executable instructions that, when executed by one or more processors, cause the processors to transmit or receive the recited data. Generally, processor-executable instructions, e.g., stored in program modules that define operating logic, include routines, programs, objects, modules, components, data structures, and the like that perform particular functions or implement particular abstract data types. Except as expressly set forth herein, the order in which the transmissions are described is not intended to be construed as a limitation, and any number of the described transmissions can be combined in any order and/or in parallel to implement the processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s).

Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A control unit comprising:
   at least one processor;
   a network interface;
   a non-transitory computer readable media storing instructions which when executed by at least one processor cause the at least one processor to perform operations comprising;
   identifying a first device identifier in a cleartext portion of an update-request message and a second device identifier in an encrypted portion of the update-request message;
   determining that the first device identifier matches the second device identifier;
   sending, to a policy engine, a confirmation request;
   receiving, from the policy engine, a confirmation;
   determining a reply message comprising the device identifier and a configuration record;
   cryptographically hashing at least a portion of the reply message to provide a cryptographic signature, wherein the at least a portion of the reply message comprises the at least one of the first device identifier or the second device identifier; and
   transmitting, via the network interface, the reply message in association with the cryptographic signature.

2. The control unit according to claim 1, the operations further comprise:
   determining that the update-request message comprises a temporary-unlock request; and
   determining a timestamp criterion indicating a time period during which the an authorization requirement should not be enforced.

3. The control unit according to claim 1, wherein the second device identifier comprises an International Mobile Equipment Identity.

4. The control unit according to claim 1, wherein the confirmation request requests a permanent unlock and the confirmation grants a temporary unlock.

5. The control unit according to claim 1, wherein the operations further comprise verifying authenticity of the second device identifier from the update-request message.

6. The control unit according to claim 1, wherein the operations further comprise receiving, via a communications interface, an update-request message.

7. The control unit according to claim 1, wherein the update-request message comprises a prior configuration record and the prior configuration record comprises an authorization requirement.

8. The control unit according to claim 1, further comprising:
   determining that the update-request message comprises an unlock request; and
   in response, determining the configuration record excluding the authorization requirement.

9. The control unit according to claim 1, wherein:
   determining that the update-request message comprises a temporary-unlock request; and
   in response, determining the configuration record comprising:
   an authorization requirement; and
   a timestamp criterion indicating a time period during which the authorization requirement should not be enforced.

10. At least one non-transitory computer-readable medium storing instructions which, when executed by at least one processor, cause the at least one processor to perform operations comprising:
    extracting a first device identifier in a cleartext portion of an update-request message and a second device identifier in an encrypted portion of the update-request message;
    determining that the first device identifier matches the second device identifier;
    cryptographically signing at least a portion of a reply message to provide a cryptographic signature, wherein the at least a portion of the reply message comprises the first device identifier; and
    transmitting, via a communications interface, the reply message in association with the cryptographic signature.

11. The at least one non-transitory computer-readable medium according to claim 10, wherein the second device identifier is a keyed-hash message authentication code.

12. The at least one non-transitory computer-readable medium according to claim 10, storing additional instructions which, when executed by the at least one processor, cause the at least one processor to perform operations comprising:
    in response to determining that the first device identifier matches the second device identifier, providing, to a policy engine, a confirmation request;
    receiving, from the policy engine, a confirmation; and
    in response to the confirmation, generating the reply message comprising the device identifier and a configuration record.

13. The at least one non-transitory computer-readable medium according to claim 12, wherein the confirmation request requests a permanent unlock and the confirmation grants a temporary unlock.

14. The at least one non-transitory computer-readable medium according to claim 13, wherein the confirmation indicates a status of the temporary unlock and period of time at which the temporary unlock expires.

15. The at least one non-transitory computer-readable medium according to claim 10, storing additional instructions which, when executed by the at least one processor, cause the at least one processor to perform operations comprising:
    verifying authenticity of the second device identifier based at least in part on contents of the update-request message.

16. The at least one non-transitory computer-readable medium according to claim 10, wherein the cryptographic signature is a public-key signature that has been cryptographically hashed using at least one of a Rivest-Shamir-Adleman Signature Scheme with Appendix—Probabilistic Signature Scheme (RSA-SSA-PSS) or Public Key Cryptography Standard (PKCS) signature techniques.

17. A method comprising, by a control unit of a network device:
    receiving, via a communications interface, an update-request message;
    extracting a first device identifier in a cleartext portion of the update-request message and a second device identifier in an encrypted portion of from the update-request message;
    verifying authenticity of the second device identifier from the update-request message;
    determining that the first device identifier matches the second device identifier;
    in response to determining that the first device identifier matches the second device identifier, providing, to a policy engine, a confirmation request;

receiving, from the policy engine, a confirmation;

in response to the confirmation, determining a reply message comprising the device identifier and a configuration record;

cryptographically signing at least a portion of the reply message to provide a cryptographic signature, wherein the at least a portion of the reply message comprises the first device identifier; and transmitting, via the communications interface, the reply message in association with the cryptographic signature.

18. The method according to claim 17, wherein:

the update-request message comprises a prior configuration record;

the prior configuration record comprises an authorization requirement; and the method further comprises, by the control unit of the network device:

determining that the update-request message comprises an unlock request; and in response, determining the configuration record excluding the authorization requirement.

19. The method according to claim 17, wherein:

the update-request message comprises a prior configuration record;

the prior configuration record comprises an authorization requirement; and the method further comprises, by the control unit of the network device:

determining that the update-request message comprises a temporary-unlock request; and in response, determining the configuration record comprising:

the authorization requirement; and a timestamp criterion indicating a time period during which the authorization requirement should not be enforced.

20. The method according to claim 17, wherein the second device identifier comprises an International Mobile Equipment Identity.

* * * * *